United States Patent
Bhattad et al.

(10) Patent No.: US 9,276,787 B2
(45) Date of Patent: Mar. 1, 2016

(54) TRANSMISSION OF SIGNALING MESSAGES USING BEACON SIGNALS

(75) Inventors: Kapil Bhattad, San Diego, CA (US); Ravi Palanki, San Diego, CA (US); Dexu Lin, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1209 days.

(21) Appl. No.: 12/411,263

(22) Filed: Mar. 25, 2009

(65) Prior Publication Data

US 2009/0245195 A1 Oct. 1, 2009

Related U.S. Application Data

(60) Provisional application No. 61/040,489, filed on Mar. 28, 2008.

(51) Int. Cl.
*H04L 27/10* (2006.01)
*H04L 5/00* (2006.01)
(Continued)

(52) U.S. Cl.
CPC .............. *H04L 27/10* (2013.01); *H04L 5/0053* (2013.01); *H04L 25/4902* (2013.01); *H04L 27/30* (2013.01); *H04L 1/0057* (2013.01); *H04L 5/0091* (2013.01); *H04L 27/2647* (2013.01)

(58) Field of Classification Search
CPC ............ H04W 72/04; H04W 72/0406; H04W 72/0413; H04W 72/042; H04W 72/048; H04W 72/0493; H04W 72/06; H04W 72/08; H04W 72/082; H04W 72/085; H04W 72/10; H04W 72/12; H04W 72/1205; H04W 72/1226; H04W 72/1242; H04W 72/1257
USPC ......... 370/328, 329, 342, 343, 344, 345, 436, 370/437, 441; 375/254, 260, 296; 4/328, 4/329, 342, 343, 344, 345, 436, 437, 441
See application file for complete search history.

(56) References Cited

U.S. PATENT DOCUMENTS

| | | | |
|---|---|---|---|
| 5,940,743 A | 8/1999 | Sunay et al. | |
| 6,240,379 B1 | 5/2001 | Yin | |

(Continued)

FOREIGN PATENT DOCUMENTS

| | | |
|---|---|---|
| CN | 1826016 A | 8/2006 |
| CN | 1890938 A | 1/2007 |

(Continued)

OTHER PUBLICATIONS

International Search Report & Written Opinion—PCT/US2009/038530, International Search Authority—European Patent Office—Mar. 23, 2010.

(Continued)

*Primary Examiner* — Chi H Pham
*Assistant Examiner* — Weibin Huang
(74) *Attorney, Agent, or Firm* — Nerrie M. Zohn

(57) ABSTRACT

Techniques for sending signaling messages with beacon signals in a wireless communication network are described. In one design, a transmitter station may map a signaling message (e.g., a reduce interference request) to multiple code symbols. The transmitter station may select multiple resource elements from among a plurality of resource elements based on the multiple code symbols. In one design, each code symbol may be sent across frequency by selecting one of multiple subcarriers in one symbol period. In another design, each code symbol may be sent across time by selecting one of multiple symbol periods on one subcarrier. The transmitter station may generate a beacon signal having transmit power on the selected resource elements and no transmit power on remaining resource elements. The transmitter station may send the beacon signal to at least one receiver station.

25 Claims, 13 Drawing Sheets

(51) Int. Cl.
H04L 25/49 (2006.01)
H04L 27/30 (2006.01)
H04L 1/00 (2006.01)
H04L 27/26 (2006.01)

(56) References Cited

U.S. PATENT DOCUMENTS

| | | | |
|---|---|---|---|
| 7,254,399 B2 | 8/2007 | Salokannel et al. | |
| 7,483,836 B2 | 1/2009 | Taori et al. | |
| 7,567,791 B2 | 7/2009 | Laroia et al. | |
| 7,639,660 B2* | 12/2009 | Kim | H04L 1/005 370/208 |
| 7,756,548 B2* | 7/2010 | Laroia et al. | 455/561 |
| 8,064,393 B2* | 11/2011 | Fukuoka et al. | 370/329 |
| 8,098,596 B2* | 1/2012 | Kwon | H04L 27/2602 370/255 |
| 8,102,882 B2* | 1/2012 | Wang et al. | 370/482 |
| 8,331,249 B2 | 12/2012 | Li et al. | |
| 8,498,242 B2* | 7/2013 | Luo | H04J 11/0069 370/210 |
| 2002/0061073 A1* | 5/2002 | Huang | H04L 1/0003 375/295 |
| 2004/0162097 A1 | 8/2004 | Vijayan et al. | |
| 2004/0166886 A1* | 8/2004 | Laroia | H04B 7/0491 455/522 |
| 2005/0013345 A1 | 1/2005 | Choi | |
| 2005/0046592 A1 | 3/2005 | Cooper et al. | |
| 2005/0250469 A1* | 11/2005 | Laroia et al. | 455/403 |
| 2006/0067293 A1* | 3/2006 | Santhoff et al. | 370/347 |
| 2006/0078040 A1 | 4/2006 | Sung et al. | |
| 2006/0203711 A1* | 9/2006 | Oh et al. | 370/208 |
| 2006/0203723 A1 | 9/2006 | Shirakabe et al. | |
| 2007/0149229 A1 | 6/2007 | Frederiksen et al. | |
| 2007/0201423 A1* | 8/2007 | Laroia | H04W 40/244 370/345 |
| 2007/0242765 A1* | 10/2007 | Parizhisky | H04L 5/023 375/260 |
| 2008/0045158 A1* | 2/2008 | Ji | 455/67.11 |
| 2008/0101447 A1 | 5/2008 | Li et al. | |
| 2009/0245331 A1 | 10/2009 | Palanki et al. | |
| 2010/0216497 A1 | 8/2010 | Kawasaki | |
| 2015/0208429 A1 | 7/2015 | Palanki et al. | |

FOREIGN PATENT DOCUMENTS

| | | |
|---|---|---|
| EP | 1542418 A1 | 6/2005 |
| JP | 2001148678 A | 5/2001 |
| JP | 2003124848 A | 4/2003 |
| JP | 2005039815 A | 2/2005 |
| JP | 2005244959 A | 9/2005 |
| JP | 2005252980 A | 9/2005 |
| JP | 2006254398 A | 9/2006 |
| JP | 2006340008 A | 12/2006 |
| JP | 2007514353 A | 5/2007 |
| JP | 2008017325 A | 1/2008 |
| JP | 2008244836 A | 10/2008 |
| WO | 2005060194 A1 | 6/2005 |
| WO | 2006087797 A1 | 8/2006 |
| WO | 2007035446 A1 | 3/2007 |
| WO | 2007073040 A1 | 6/2007 |
| WO | 2007147431 A1 | 12/2007 |
| WO | WO2008033985 | 3/2008 |
| WO | WO2008049136 | 4/2008 |
| WO | 2008058150 A2 | 5/2008 |
| WO | 2008121386 A2 | 10/2008 |
| WO | WO2009036217 | 3/2009 |
| WO | 2009120478 A2 | 10/2009 |

OTHER PUBLICATIONS

Lie-Liang Yang: "Time-Hopping Multicarrier Code-Division Multiple Access" IEEE Transactions on Vehicular Technology, vol. 56, No. 2, Mar. 1, 2007, pp. 731-741, XP011175776 Piscataway, NJ, USA ISSN: 0018-9545 sections I I . A , II.D figures 1, 2, 4, 5.

Stantchev B et al: "An integrated FSK-signaling scheme for OFDM-based advanced cellular radio" IEEE 47th Vehicular Technology Conference (VTC), Held in Phoenix, AZ, USA, vol. 3, May 4, 1997-May 7, 2007 pp. 1629-1633, XP010229043 New York, NY, USA ISBN: 978-0-7803-3659-9 abstract section III figures 3 ,4.

Taiwan Search Report—TW098110247—TIPO—May 24, 2013.

Arai, T., et al., "The Influence of the Partial Band Interference in Orthogonal Multicarrier M-ary/SSMA Systems," Technical Report of the Institute of Electronics, Information and Communication Engineers, Mar. 19, 1998, vol. 97, No. 610, pp. 25-30, SST97-118.

Atarashi H., et al., "Performance of VSF-OFCDM with Two-Dimensional Spreading Prioritizing Time Domain Spreading", Technical Report of the Institute of Electronics, Information and Communication Engineers, Jun. 21, 2002, vol. 102, No. 148, pp. 61-66, RCS2002-85.

Baidas, M.W., et al.,"The Performance of Coded Non-Coherent M-ary Orthogonal Keying Based OFDM Systems in a Frequency Selective and Fast Time-Varying Channel", Communications, 2007. ICC '07. IEEE International Conference, Jun. 28, 2007, pp. 2930-2935.

Cho J., et al., "A novel frequency-hopping spread-spectrum multiple-access network using M-ary orthogonal Walsh sequence keying", Communications, IEEE Transactions, Nov. 2003, vol. 51, No. 11, pp. 1885-1896.

Harada Y., et al., "Study on Delay Wave Canceller and Application to OFDM System," Technical Report of the Institute of Electronics, Information and Communication Engineers, Japan, The Institute of Electronics, Information and Communication Engineers, Nov. 1, 2007, RCS2007-101.

Iversen K., et al., "D2-ary Signaling for Incoherent All-Optical CDMA Systems", Information Theory, 1997. Proceedings., Jul. 4, 1997, pp. 484.

Yates, "A Framework for Uplink Power Control in Cellular Radio Systems", IEEE Journal on Selected Areas in Communications, vol. 13, No. 7, 1995, pp. 1341-1347.

* cited by examiner

TRANSMISSION OF SIGNALING MESSAGES USING BEACON SIGNALS

The present application claims priority to provisional U.S. Application Ser. No. 61/040,489, entitled "ORTHOGONAL RESOURCE UTILIZATION MESSAGE (RUM) DESIGN," filed Mar. 28, 2008, assigned to the assignee hereof and incorporated herein by reference.

BACKGROUND

I. Field

The present disclosure relates generally to communication, and more specifically to techniques for sending and receiving signaling messages in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may send signaling messages to a UE for various purposes. The UE may also send signaling messages to the base station for various purposes. The signaling messages may be useful to support communication between the base station and the UE. It is desirable to efficiently and reliably send signaling messages.

SUMMARY

Techniques for sending signaling messages in a wireless communication network are described herein. In an aspect, a signaling message (e.g., a reduce interference request) may be sent using a beacon signal. A beacon signal is a signal in which information is conveyed by specific resource elements used for the signal instead of in modulation symbols sent on the resource elements. The resource elements used for the beacon signal may be selected from a group of resource elements based on the information to send in the beacon signal. High power is typically used for the selected resource elements, and low or no power may be used for the unselected resource elements.

In one design, a transmitter station may generate a signaling message, e.g., a reduce interference request asking at least one interfering station to reduce interference to the transmitter station. The transmitter station may map the signaling message to at least one information symbol and may then encode the at least one information symbol in accordance with a block code to obtain multiple code symbols. The transmitter station may select multiple resource elements from among a plurality of resource elements based on the multiple code symbols. The transmitter station may generate a beacon signal having transmit power on the selected resource elements and no transmit power on remaining resource elements. The transmitter station may send the beacon signal to at least one receiver station.

Multiple sets of resource elements may be formed with the plurality of resource elements, one set of resource elements for each code symbol. In one design, each code symbol may be sent across frequency in one symbol period. In this design, each set of resource elements may cover multiple subcarriers in one symbol period. One of the multiple subcarriers may be selected in each symbol period based on a code symbol to send in that symbol period. In another design, each code symbol may be sent across time on one subcarrier. In this design, each set of resource elements may cover one subcarrier in multiple symbol periods. One of the multiple symbol periods on each subcarrier may be selected based on a code symbol to send on that subcarrier.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
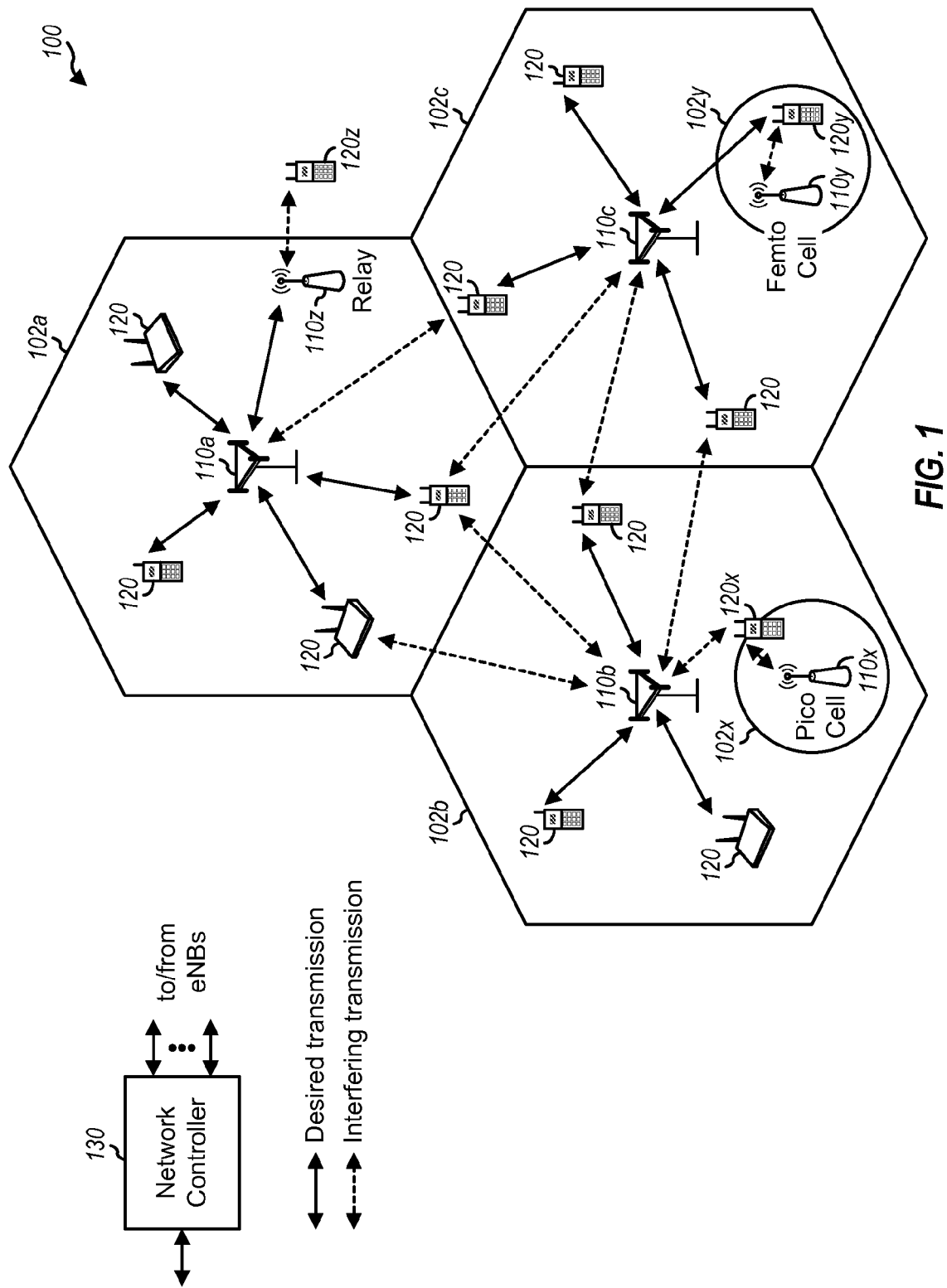
FIG. 1 shows a wireless communication network.

FIG. 1 shows a wireless communication network 100, which may include a number of base stations 110 and other network entities. A base station may be a station that communicates with the UEs and may also be referred to as a Node B, an evolved Node B (eNB), an access point, etc. Each base station 110 may provide communication coverage for a particular geographic area. The term "cell" can refer to a coverage area of a base station and/or a base station subsystem serving this coverage area.

A base station may provide communication coverage for a macro cell, a pico cell, a femto cell, etc. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell. A base station for a macro cell may be referred to as a macro base station. A base station for a pico cell may be referred to as a pico base station. A base station for a femto cell may be referred to as a femto base station or a home base station.

In the example shown in FIG. 1, base stations 110a, 110b and 110c may be macro base stations for macro cells 102a, 102b and 102c, respectively. Base station 110x may be a pico base station for a pico cell 102x. Base station 110y may be a femto base station for a femto cell 102y. The pico cells and femto cells may be located within the macro cells (e.g., as shown in FIG. 1) and/or may overlap the macro cells.

Wireless network 100 may also include relay stations, e.g., a relay station 110z. A relay station is a station that receives a transmission of data and/or other information from an upstream station and sends a transmission of the data and/or other information to a downstream station. A network controller 130 may couple to a set of base stations and provide coordination and control for these base stations. Network controller 130 may be a single network entity or a collection of network entities.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a base station via the downlink and uplink. The downlink (or forward link) refers to the communication link from the base station to the UE, and the uplink (or reverse link) refers to the communication link from the UE to the base station. A UE may be able to communicate with macro base stations, pico base stations, femto base stations, relays, etc. In FIG. 1, a solid line with double arrows indicates desired transmissions between a UE and a serving base station, which is a base station designated to serve the UE on the downlink and/or uplink. A dashed line with double arrows indicates interfering transmissions between a UE and a base station.

Wireless network 100 may be a homogeneous network that includes only macro base stations. Wireless network 100 may also be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts) whereas pico and femto base stations may have a lower transmit power level (e.g., 1 Watt). The techniques described herein may be used for homogeneous and heterogeneous networks.

Wireless network 100 may be a synchronous network or an asynchronous network. In a synchronous network, the base stations may have the same frame timing, and transmissions from different base stations may be aligned in time. In an asynchronous network, the base stations may have different frame timing, and transmissions from different base stations may not be aligned in time. The techniques described herein may be used for synchronous and asynchronous networks.

Wireless network 100 may utilize orthogonal frequency division multiplexing (OFDM) and/or single-carrier frequency division multiplexing (SC-FDM). For example, wireless network 100 may be an LTE network that utilizes OFDM on the downlink and SC-FDM on the uplink. OFDM and SC-FDM partition the system bandwidth into multiple (NFFT) subcarriers, which may also be referred to as tones, bins, etc. The spacing between adjacent subcarriers may be fixed, and the total number of subcarriers (NFFT) may be dependent on the system bandwidth. For example, NFFT may be equal to 128, 256, 512, 1024 or 2048 for system bandwidth of 1.25, 2.5, 5, 10 or 20 MHz, respectively.

A UE may communicate with a serving base station in a dominant interference scenario, which may be characterized by the interference power being higher than the desired signal power. On the downlink, the UE may observe high interference from one or more interfering base stations. On the uplink, the serving base station may observe high interference from one or more interfering UEs. A dominant interference scenario may be due to range extension, which is a scenario in which a UE connects to a base station with lower pathloss and lower geometry among multiple base stations detected by the UE. For example, UE 120x in FIG. 1 may communicate with pico base station 110x with lower pathloss and lower geometry and may observe high interference from macro base station 110b. This may be desirable to reduce interference to the wireless network to achieve a given data rate for the UE. A dominant interference scenario may also be due to restricted association, which is a scenario in which a UE is unable to connect to a strong base station with restricted access and may then connect to a weaker base station with unrestricted access. For example, UE 120y in FIG. 1 may be unable to connect to femto base station 110y and may then connect to macro base station 110c. UE 120y may observe high interference from femto base station 110y and may also cause high interference to this base station.

Interference mitigation may be used to mitigate (e.g., to avoid or reduce) interference on a given link in order to improve performance of data transmission. Interference mitigation may also be used to provide cell splitting gains. For example, a macro base station may reserve resources that may be used by multiple pico base stations to simultaneously serve different UEs. For interference mitigation, an interfering station may blank or reduce its transmit power or may beamsteer its transmission so that higher received signal quality can be achieved for a desired transmission for a target station. In the description herein, a station may be a base station, a UE, a relay, etc. Received signal quality may be quantified by signal-to-noise-and-interference ratio (SINR) or some other metric.

Figure 2:
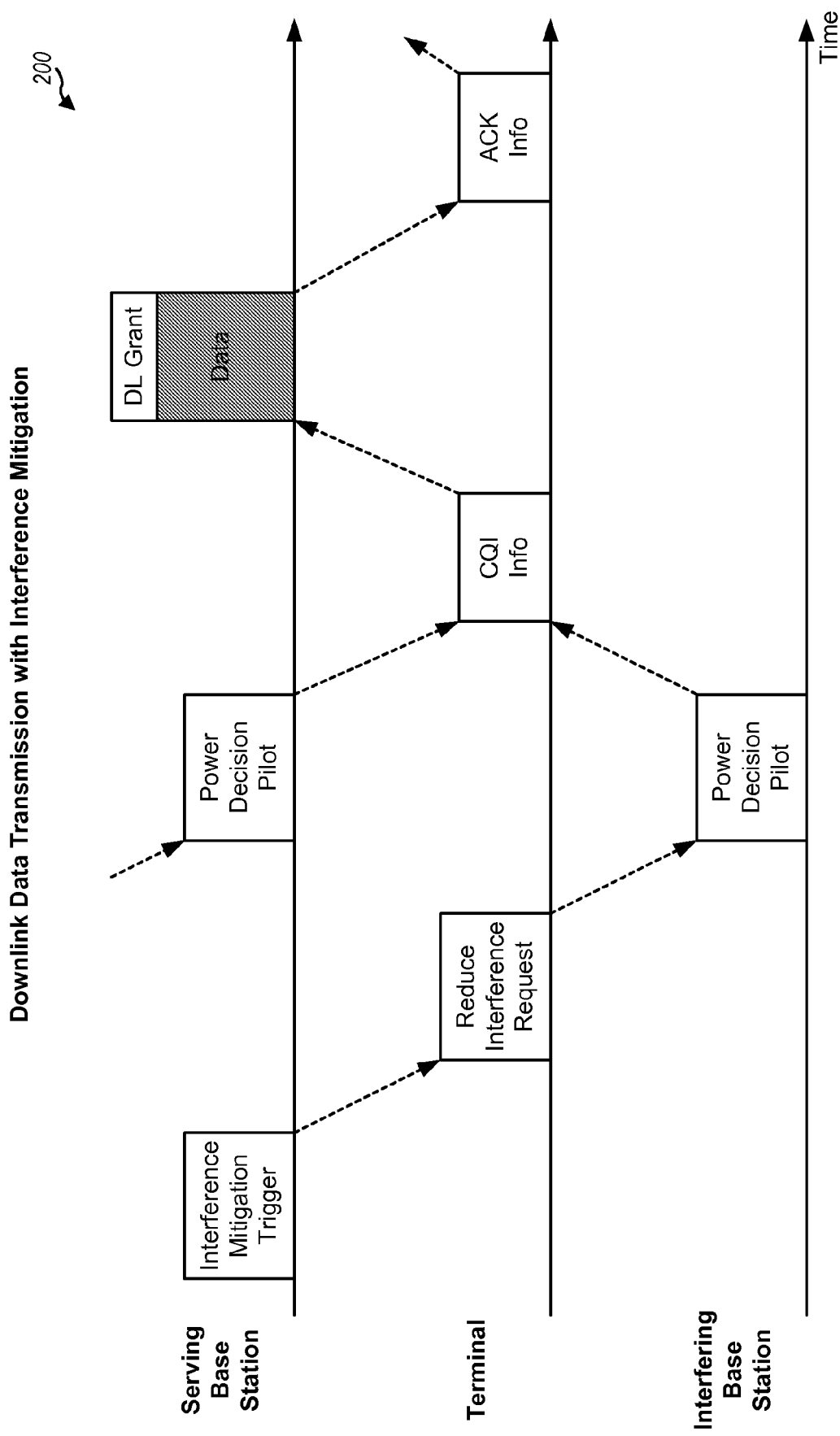
FIG. 2 shows downlink data transmission with interference mitigation.

FIG. 2 shows a design of a downlink data transmission scheme 200 with interference mitigation. A serving base station may have data to send to a UE and may have knowledge that the UE is observing high interference on the downlink.

For example, the serving base station may receive pilot measurement reports from the UE, and the reports may indicate and/or identify strong interfering base stations. The serving base station may send an interference mitigation trigger to the UE. This trigger may invoke the UE to request interfering base stations to reduce interference on the downlink. This trigger may also convey specific resources on which to reduce interference, the priority of the request, and/or other information.

The UE may receive the interference mitigation trigger from the serving base station and may send a reduce interference request. The reduce interference request may also be referred to as a resource utilization message (RUM). The UE may send the reduce interference request (i) as a unicast message to only strong interfering base stations or (ii) as a broadcast message to all neighbor base stations. The reduce interference request may ask the interfering base stations to reduce interference on specified resources and may also convey the priority of the request, a target interference level for the UE, and/or other information.

An interfering base station may receive the reduce interference request from the UE and may grant or dismiss the request. If the request is granted, then the interfering base station may adjust its transmit power and/or steer its transmission in order to reduce interference to the UE. In one design, the interfering base station may determine a transmit power level $P_d$ that it will use on the specified resources based on various factors such as its buffer status, the priority of the request, the target interference level of the UE, etc. The interfering base station may then transmit a power decision pilot at a power level of $P_{pdp}$, where $P_{pdp}$ may be equal to $P_d$ or a scaled version of $P_d$.

The UE may receive power decision pilots from all interfering base stations and the serving base station. The UE may estimate the SINR of the specified resources based on the received pilots, determine channel quality indicator (CQI) information based on the SINR estimates, and send the CQI information to the serving base station.

The serving base station may receive the CQI information from the UE and may schedule the UE for data transmission on assigned resources, which may include all or a subset of the specified resources. The serving base station may select a modulation and coding scheme (MCS) based on the CQI information and may process a data packet in accordance with the selected MCS. The serving base station may generate a downlink (DL) grant, which may include the assigned resources, the selected MCS, etc. The serving base station may send the downlink grant and a packet transmission to the UE. The UE may receive the downlink grant and the packet transmission and may decode the received transmission in accordance with the selected MCS. The UE may then generate acknowledgement (ACK) information, which may indicate whether the packet was decoded correctly or in error by the UE, and may send the ACK information to the serving base station.

Figure 3:
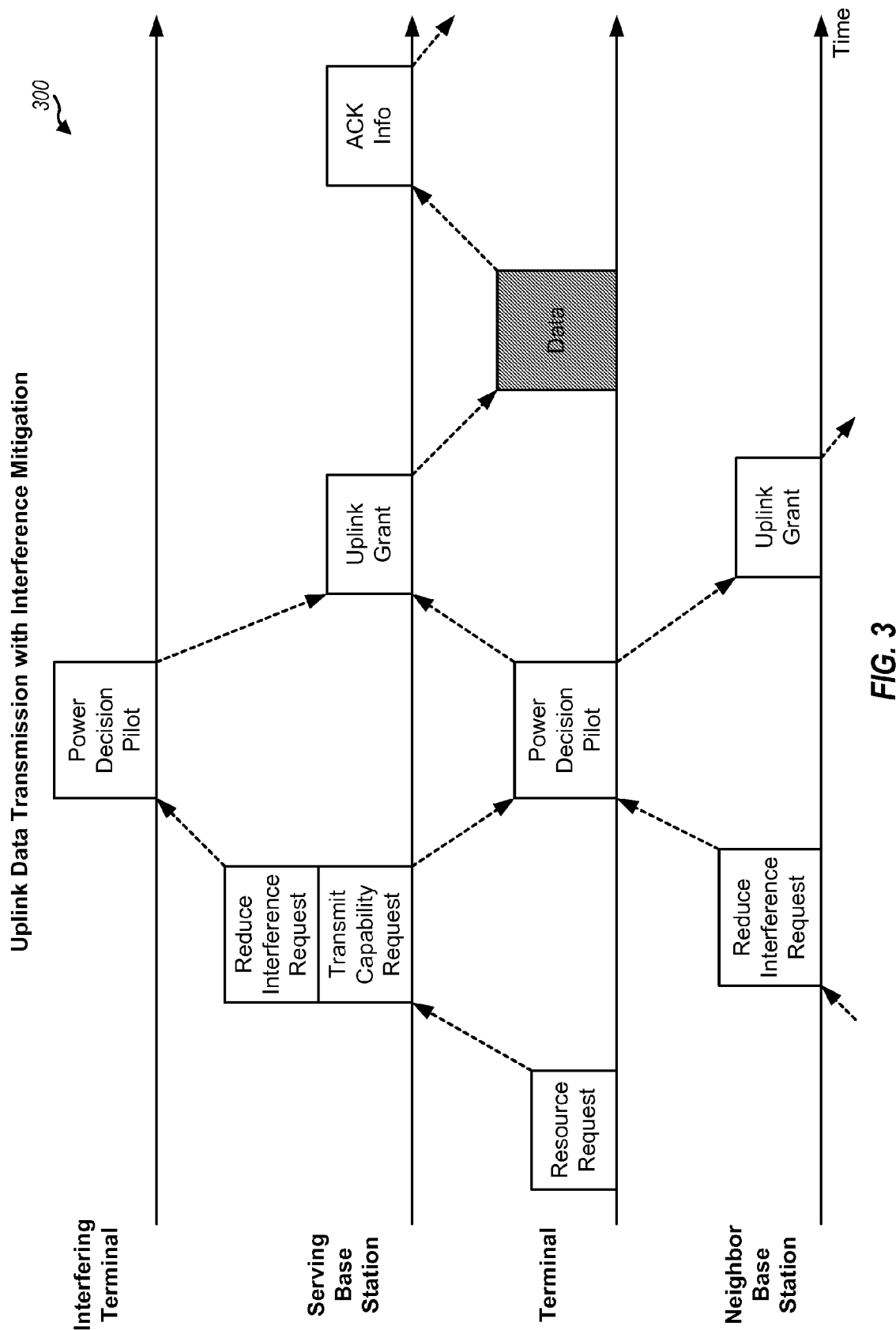
FIG. 3 shows uplink data transmission with interference mitigation.

FIG. 3 shows a design of an uplink data transmission scheme 300 with interference mitigation. A UE may have data to send to a serving base station and may send a resource request. The resource request may indicate the priority of the request, the amount of data to send by the UE, etc. The serving base station may receive the resource request and may send a transmit capability request to the UE to ask for the transmit capability of the UE on specific resources. The serving base station may also send a reduce interference request to ask interfering UEs to reduce interference on the specific resources. The serving base station may send the reduce interference request (i) as a unicast message to only strong interfering UEs or (ii) as a broadcast message to all interfering UEs.

The UE may receive the transmit capability request from the serving base station and may also receive a reduce interference request from a neighbor base station. The UE may determine the transmit power level that it can use on the specified resources based on the reduce interference request from the neighbor base station. The UE may convey this transmit power level via a power decision pilot.

The serving base station may receive the power decision pilots from the UE as well as the interfering UEs. The serving base station may estimate the SINR of the specified resources based on the received pilots and may select an MCS for the UE based on the SINR estimates. The serving base station may generate and send an uplink grant, which may include the selected MCS, the assigned resources, the transmit power level to use for the assigned resources, etc. The UE may receive the uplink grant, process a packet in accordance with the selected MCS, and send a packet transmission on the assigned resources. The serving base station may receive the packet transmission from the UE, decode the received transmission, determine ACK information based on the decoding result, and send the ACK information to the UE.

As shown in FIGS. 2 and 3, various signaling messages may be sent on the downlink and uplink in order to support interference mitigation. Each signaling message may include any type of information. For example, a reduce interference request may include some or all of the following information:
  Resource index—identify resources on which less interference is requested,
  Priority level—indicate the priority of the reduce interference request,
  Spatial feedback information—used to beamsteer away from the sender, and
  Transmitter identity (ID)—identify the sender of the reduce interference request.
A reduce interference request may also include different and/or additional information.

A signaling message of a particular type (e.g., a reduce interference request) may be sent on resources that may be reserved for sending signaling messages of that type. Resources may be reserved in various manners. In one design, the reserved resources may comprise frequency resources that may be available all the time. This design may be especially applicable for an asynchronous network. In another design, the reserved resources may comprise specific time and frequency resources. This design may be more applicable for a synchronous network.

Figure 4A:
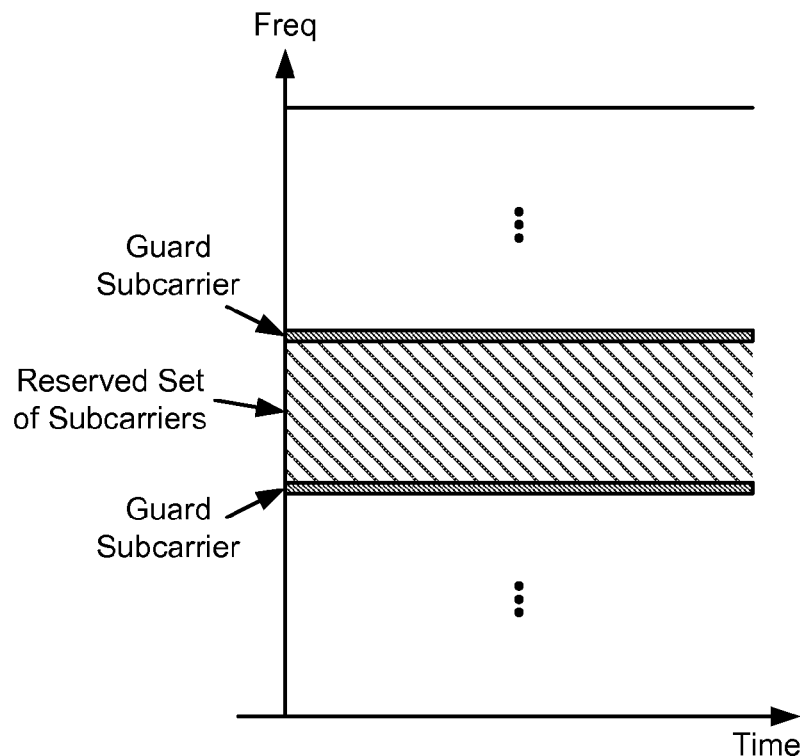
FIGS. 4A and 4B show frequency resources reserved for signaling messages.

FIG. 4A shows a design of reserving frequency resources for sending signaling messages of a particular type, e.g., reduce interference requests. In this design, a set of contiguous subcarriers may be reserved for sending the signaling messages. In general, the set of subcarriers may be located anywhere within the system bandwidth. In one design, one or more guard subcarriers may be used to protect/isolate the reserved subcarriers from the non-reserved subcarriers used for sending data, etc. For example, one guard subcarrier may be used on each side of the reserved subcarriers, as shown in FIG. 4A. The guard subcarriers may protect a signaling message sent on the reserved subcarriers from inter-carrier interference (ICI) due to transmissions on the non-reserved subcarriers, which may improve detection of the signaling message.

Figure 4B:
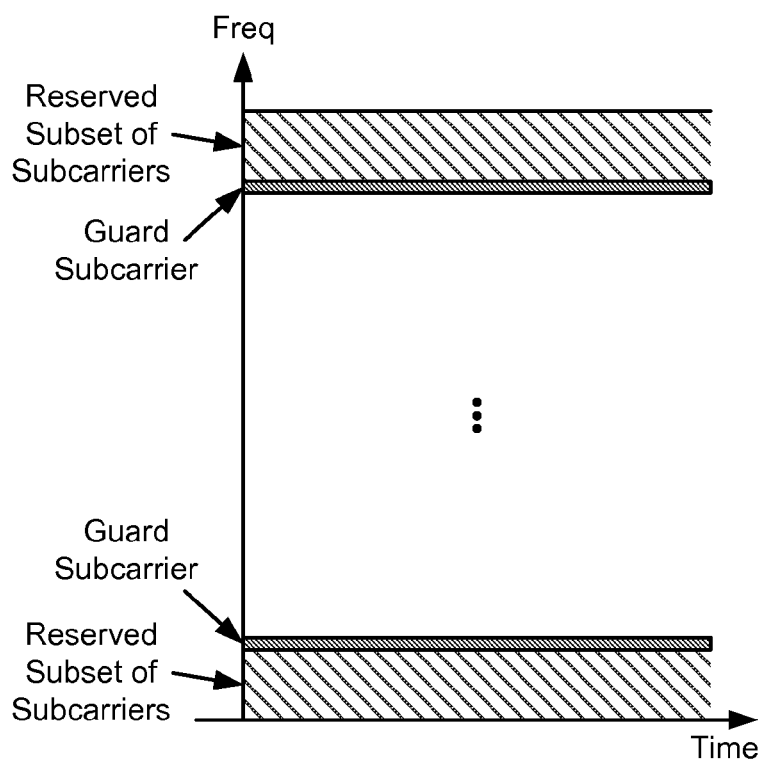

FIG. 4B shows another design of reserving frequency resources for sending signaling messages of a particular type, e.g., reduce interference requests. In this design, a set of subcarriers may be reserved for sending the signaling messages and may comprise two subsets of contiguous subcarriers. Each subset may include half of the reserved subcarriers. In general, the subsets of subcarriers may be located anywhere within the system bandwidth. In the design shown in FIG. 4B, the two subsets are located at the two edges of the system bandwidth. In one design, one or more guard subcarriers may be used to protect each subset of reserved subcarriers from the non-reserved subcarriers, as shown in FIG. 4B.

FIGS. 4A and 4B show two exemplary designs of reserving frequency resources for sending signaling messages of a particular type. Time and/or frequency resources may also be reserved in other manners for sending signaling messages. For example, more than two subsets of subcarriers may be reserved for sending signaling messages. As another example, blocks of time-frequency resources may be reserved for sending signaling messages. This may be especially applicable for synchronous operation.

In one design, different resources (e.g., different sets of subcarriers, different blocks of time-frequency resources, etc.) may be reserved for sending signaling messages (e.g., reduce interference requests) by base stations of different power classes. In another design, different resources may be reserved for sending signaling messages at different transmit power levels. A transmitter station may send a signaling message on one reserved subcarrier set that may be selected based on the power class of the transmitter station, the distance from the transmitter station to a receiver station, etc.

In one design, different resources may be reserved for different cells for sending signaling messages of a particular type. This per-cell design may avoid collisions between signaling messages from different cells. In another design, the same resources may be reserved for all cells for sending signaling messages of the particular type. This global design may reduce overhead for sending signaling messages. The resources used to send signaling messages may be reserved and cleared of interference from other transmissions. A base station may clear the reserved resources even if the base station does not use these resources for its signaling messages.

The signaling messages in FIGS. 2 and 3, as well as other signaling messages used to support communication between base stations and UEs, may be sent in various manners. A signaling message of a particular type (e.g., a reduce interference request) may be sent on resources reserved for sending that signaling message.

In an aspect, a signaling message (e.g., a reduce interference request) may be sent with a beacon signal. A beacon signal may be generated in various manners.

In a first beacon design, each code symbol for a beacon signal may be sent across frequency. A signaling message (e.g., a reduce interference request) may be mapped to S information symbols in Galois field (GF) (N), where S>1 and N>1. Each information symbol may have a value within a range of 0 to N−1. The S information symbols may be encoded with a block code (e.g., a Reed-Solomon code) to obtain a codeword comprising T code symbols in GF(N). Each code symbol may be sent in one symbol period. In each symbol period, one of N subcarriers may be selected based on the value of a code symbol sent in that symbol period. The selected subcarrier may be referred to as a beacon subcarrier. An OFDM symbol or an SC-FDMA symbol may be generated with high transmit power on the beacon subcarrier and low or no power on remaining subcarriers. This OFDM or SC-FDMA symbol may be referred to as a beacon symbol and may be sent in one symbol period. The beacon signal may comprise T beacon symbols generated with the T code symbols. The T beacon symbols may be sent in T continuous or non-continuous symbol periods, one symbol period for each beacon symbol.

The number of information bits (B) that can be sent in a signaling message may be dependent on the GF size (N) and the number of information symbols (S) and may be expressed as:

$$B=\lfloor \log_2(N^S) \rfloor, \qquad \text{Eq (1)}$$

where "$\lfloor x \rfloor$" denotes a floor operator that provides the largest integer that is equal to or less than x. More information bits may be sent with a larger GF size and/or more information symbols. The GF size may be selected based on various factors such as the amount frequency resources to reserve for sending the signaling message, the design of the block code, etc. The reliability of the signaling message may be dependent on the code rate S/T. For a given S, greater reliability may be achieved with more code symbols, which would require more resources to send a beacon signal.

Figure 5:
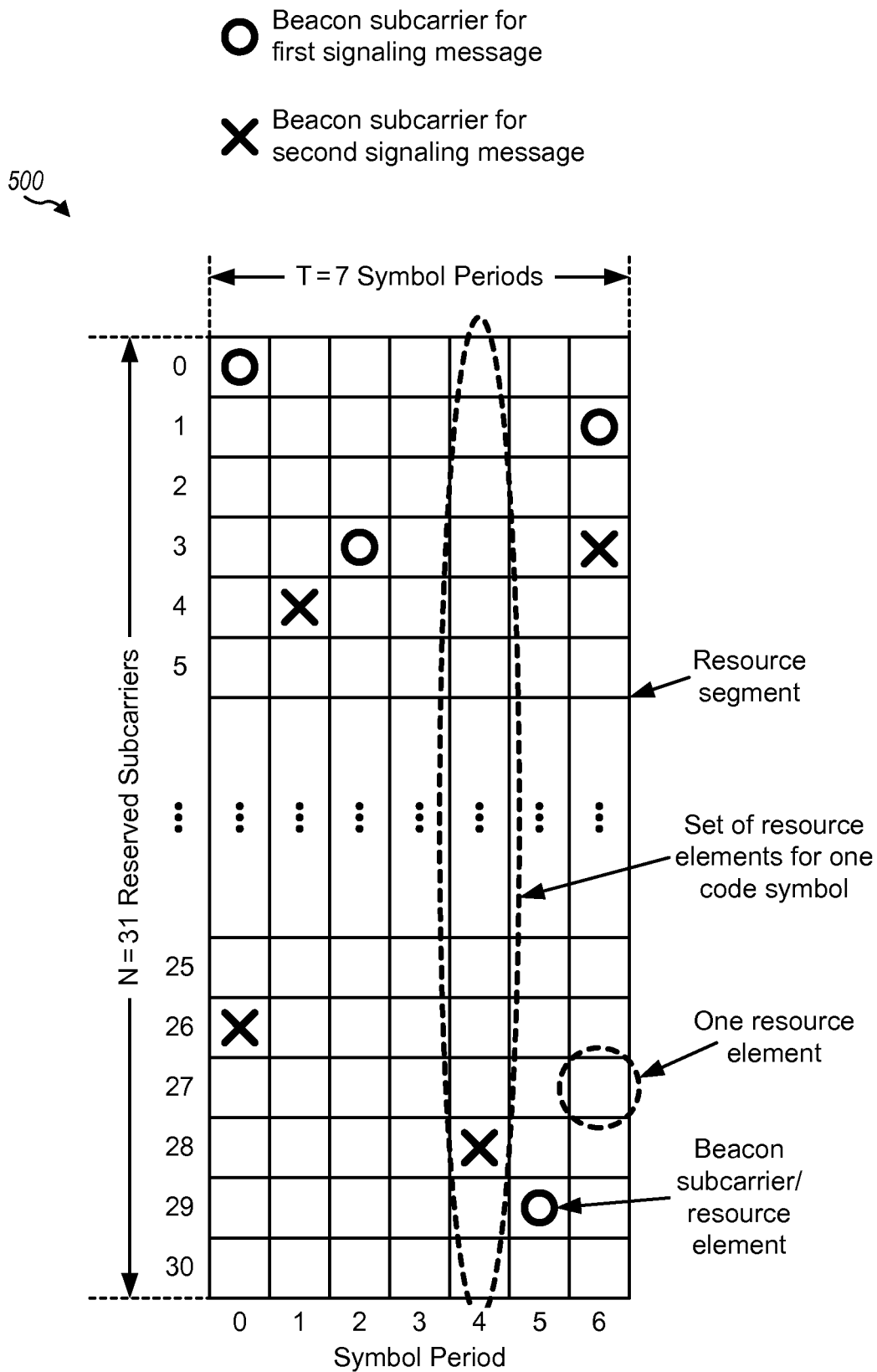
FIG. 5 shows transmission of a beacon signal across frequency.

FIG. 5 shows an exemplary transmission 500 for sending a signaling message (e.g., a reduce interference request) with a beacon signal in accordance with the first beacon design. In this example, the beacon signal is sent in a resource segment covering N=31 subcarriers in T=7 symbol periods. A 14-bit signaling message may be mapped to S=3 information symbols in GF(31). The three information symbols may be encoded with a (7, 3) Reed-Solomon code to obtain a codeword comprising T=7 code symbols in GF(31). A GF size of 31 may simplify the design of the Reed-Solomon code, but other GF sizes may also be used. Each code symbol may be used to select one of N=31 subcarriers in one symbol period. Seven beacon subcarriers may be selected by the seven code symbols in seven symbol periods. In each symbol period, a beacon symbol may be generated with high transmit power on the beacon subcarrier and no transmit power on the unselected subcarriers. Each beacon symbol may be sent in one symbol period.

FIG. 5 shows only a portion of the resource segment covering 31 subcarriers in 7 symbol periods. FIG. 5 also shows transmissions of two beacon signals for two signaling messages (e.g., two reduce interference requests) in the resource segment. The beacon subcarriers for one beacon signal are labeled with "×", and the beacon subcarriers for the other beacon signal are labeled with "o". A transmitter station (e.g., a UE) typically transmits only one beacon signal in a resource segment, e.g., either on subcarriers labeled "×" or subcarriers labeled "o". A receiver station (e.g., a base station) may receive beacon signals from multiple transmitter stations in a resource segment, e.g., as shown in FIG. 5.

The resource segment design shown in FIG. 5 may be advantageously used in LTE. In LTE, the transmission timeline may be partitioned into units of subframes. Each subframe may have a predetermined duration, e.g., one millisecond (ms), and may cover 14 symbol periods 0 through 13 for a normal cyclic prefix. Each subframe may include (i) a reference signal sent in symbol periods 0, 1, 4, 7, 8 and 11 and (ii) control information sent in symbol periods 0, 1 and 2. The seven symbol periods in the resource segment in FIG. 5 may correspond to symbol periods 3, 5, 6, 9, 10, 12 and 13 of a subframe. A beacon signal sent in the resource segment may then avoid the reference signal and the control information in the subframe.

Figure 6:
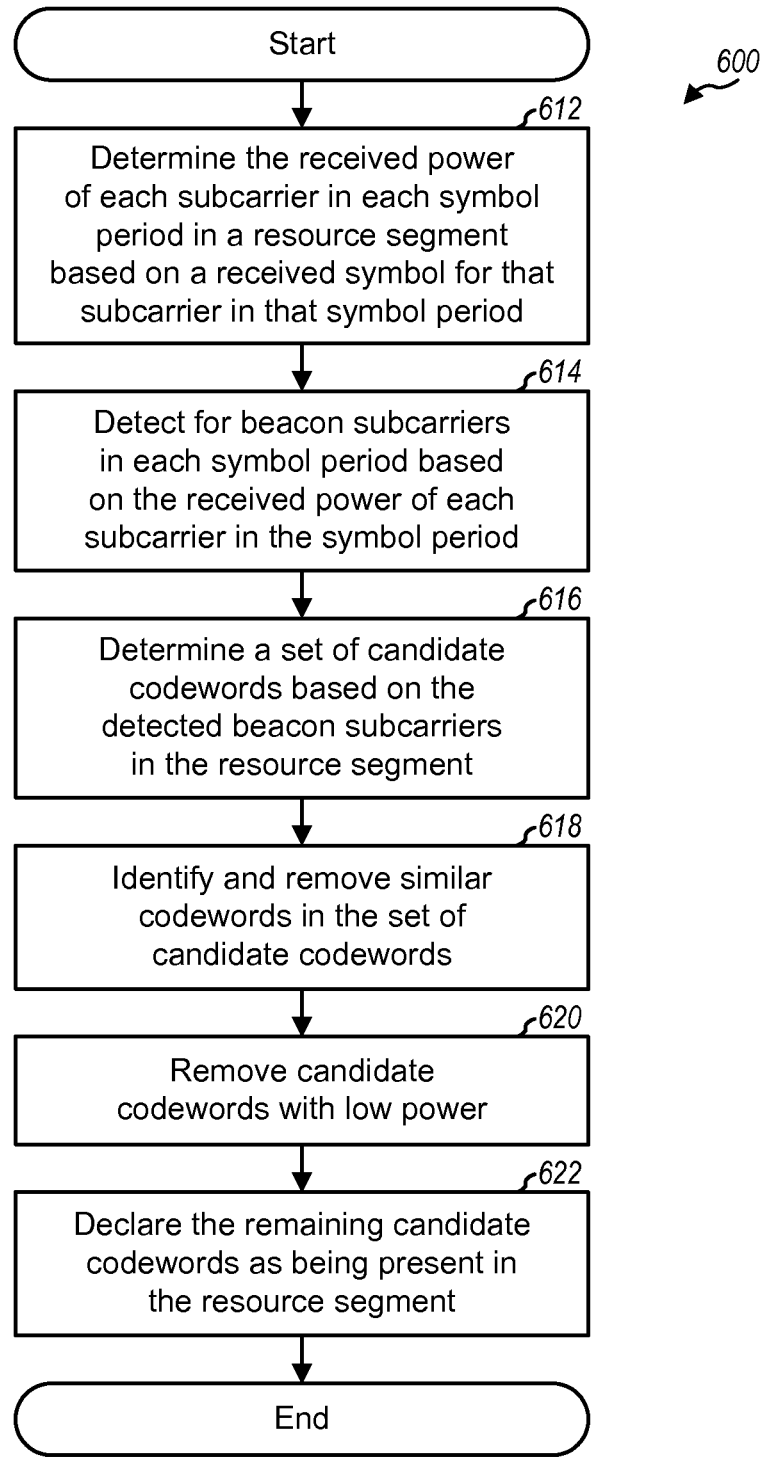
FIG. 6 shows a process for detecting for beacon signals.

FIG. 6 shows a design of a process 600 for detecting for beacon signals sent in accordance with the first beacon design. The received power of each subcarrier in each symbol period in a resource segment may be determined based on a received symbol for that subcarrier in that symbol period (block 612). Beacon subcarriers in each symbol period may be detected based on the received power of each subcarrier in the symbol period (block 614). In each symbol period, the received power of each subcarrier may be compared against a power threshold, and a beacon subcarrier may be detected for each subcarrier with received power exceeding the power threshold. In one design, the power threshold may be a static value, which may be determined based on computer simulation or empirical measurement. In another design, the power threshold may be determined dynamically, e.g., based on an estimate of received noise and interference. In any case, the power threshold may be set to achieve reliable detection of the beacon subcarriers in the presence of noise and interference.

In one design, the number of detected beacon subcarriers per symbol period for a given resource segment may be limited to Z, where $Z \geq 1$ in general and $Z=5$ in one example. In this design, up to Z strongest beacon subcarriers with received power exceeding the power threshold may be detected in each symbol period. Z may determine the maximum number of signaling messages that can be detected in the resource segment.

A set of candidate codewords may be determined based on the detected beacon subcarriers in the resource segment (block 616). A signaling message may have one of M possible values, which may be associated with M possible codewords defined by a block code, where $M \leq N^S$. Each codeword may comprise a different sequence of T code symbols. In one design, all codewords with at least D out of T beacon subcarriers matching the detected beacon subcarriers may be identified as candidate codewords and may be stored in the candidate set, where $1 \leq D < T$ in general and $D=T-1$ or $D=T-2$ for some examples. In one design of block 616, each possible codeword may be examined to determine whether the beacon subcarriers for at least D code symbols in that codeword are detected in the resource segment. In another design of block 616, a Z×T table may store up to Z detected beacon subcarriers in each symbol period in the resource segment. A Z×S block may be defined to cover a portion of the table. Each possible combination of S beacon subcarriers in the block may be used to identify a codeword. For Reed-Solomon codes, for each combination of the S beacon subcarriers in S symbol periods, there exists a codeword in a Reed-Solomon codebook with beacon subcarriers in those S symbol periods. That codeword may be found by performing erasure decoding of a sequence of size T composed of S beacon subcarriers in the S symbol periods and erasures in the remaining symbol periods. The codeword may be placed in the candidate set if at least D out of T beacon subcarriers for the codeword are present in the table. The process may be repeated for different Z×S blocks in the table, with the number of blocks being dependent on the values of D, S and T.

The decoding described above may be illustrated by an example in which $S=3$, $T=6$, $Z=3$ and $D=5$. The detected beacon subcarriers in each of six consecutive symbol periods may be as shown in Table 1. Beacon subcarriers 1, 2 and 3 are detected in symbol period t, beacon subcarriers 12 and 15 are detected in symbol period t+1, etc.

TABLE 1

| Symbol Period t | Symbol Period t + 1 | Symbol Period t + 2 | Symbol Period t + 3 | Symbol Period t + 4 | Symbol Period t + 5 |
|---|---|---|---|---|---|
| 1 | 12 | 0 | 17 | 1 | 8 |
| 2 | 15 | 1 |  | 0 | 2 |
| 3 |  |  |  | 5 |  |

A 3×3 block may be defined to cover symbol periods t+1, t+3 and t+5. Four possible combinations of $S=3$ beacon subcarriers are present in this block and may be given as {12, 17, 8}, {12, 17, 2}, {15, 17, 8} and {15, 17, 2}. Erasure decoding may be performed for the four possible combinations, which may be given as {E, 12, E, 17, E, 8}, {E, 12, E, 17, E, 2}, {E, 15, E, 17, E, 8} and {E, 15, E, 17, E, 2}, where "E" denotes an erasure. The erasure decoding may provide four codewords corresponding to the four combinations. Each codeword may include six code symbol periods sent on six beacon subcarriers in six symbol periods. For each codeword, if at least $D=5$ beacon subcarriers for the codeword are present in Table 1, then that codeword may be placed in the candidate set. The process may be repeated for different 3×3 blocks to identify all candidate codewords.

In one design, similar codewords in the set of candidate codewords may be identified and removed (block 618). Spurious codewords may be formed by combinations of beacon subcarriers corresponding to transmitted codewords. A false alarm may occur by declaring a codeword as being detected when it was not actually transmitted. To reduce false alarm due to spurious codewords, a similarity metric may be computed for each candidate codeword, as follows:

similarity metric(w)=number of matched beacon subcarriers (w)−number of similar beacon subcarriers (w), Eq (2)

where similarity metric (w) is the similarity metric for candidate codeword w.

The number of matched beacon subcarriers (w) is the number of beacon subcarriers for codeword w that match the detected beacon subcarriers in the resource segment. The number of similar beacon subcarriers (w), which is also referred to as the similarity of codeword w, is the number of beacon subcarriers for codeword w that match the beacon subcarriers for all candidate codewords other than codeword w. The similarity metric for each candidate codeword may be computed and compared against a similarity threshold. Each candidate codeword with a similarity metric less than the similarity threshold may be removed from the candidate set. The process may be repeated whenever a candidate codeword is removed.

In one design, candidate codewords with low power may be removed in order to further reduce false alarm (block 620). In one design, a power metric may be computed for each candidate codeword w, as follows:

$$P_w = \sum_t \max(P_{w,t}, P_{max}), \quad \text{Eq (3)}$$

where $P_{w,t}$ is the received power of the beacon subcarrier for the t-th code symbol of candidate codeword w, $P_w$ is the total received power of candidate codeword w, and $P_{max}$ is a maximum value that limits $P_{w,t}$ for each code symbol.

$P_{max}$ may be used to prevent $P_w$ from being dominated by one or few strong beacon subcarriers with high received power. The power metric for each candidate codeword may be computed and compared against a power threshold. Each candidate codeword with a power metric lower than the power threshold may be removed.

Candidate codewords may also be removed based on other criteria and metrics. After removing spurious codewords, low-power codewords, and/or codewords identified in other manners, the remaining candidate codewords may be declared as being present in the resource segment (block 622).

FIG. 6 shows an exemplary design of detecting for beacon signals in a resource segment. Beacon signals may also be detected in other manners. The detection may assume that the time and frequency location of the resource segment is known but the number of beacon signals transmitted in the resource segment is unknown. A large number of candidate codewords may be present based on the detected beacon subcarriers. Various schemes may be used to evaluate the candidate codewords, remove codewords that are less likely to have been transmitted, and identify codewords that are likely to have been transmitted.

In a second beacon design, each code symbol for a beacon signal may be sent across time. A signaling message (e.g., a reduce interference request) may be mapped to S information symbols in GF (T). The S information symbols may then be encoded with a block code (e.g., a Reed-Solomon code) to obtain a codeword comprising L code symbols in GF(T). L and T may be any suitable integer values. Each code symbol may be sent on a specific subcarrier but in a variable symbol period determined based on the value of that code symbol.

Figure 7:
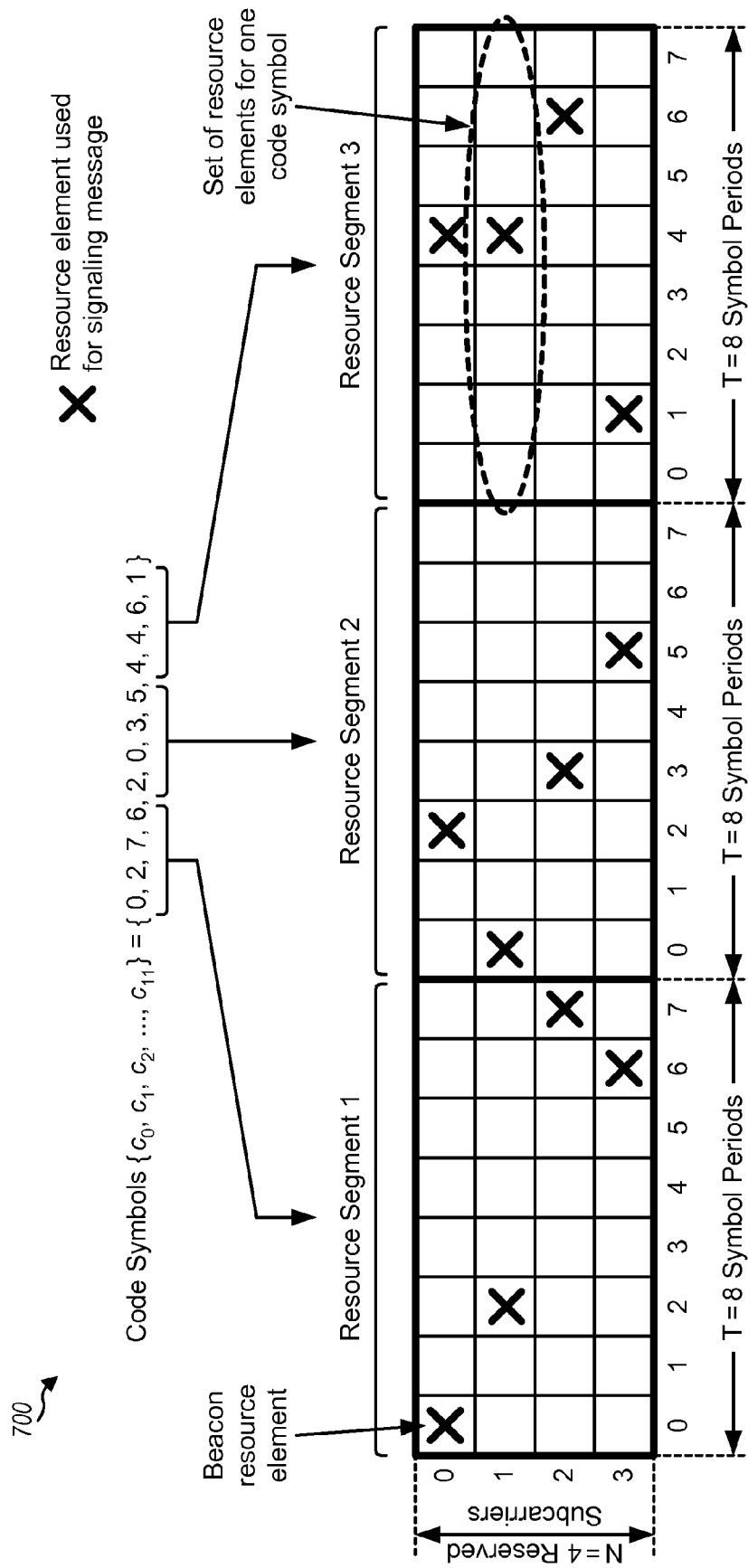
FIG. 7 shows transmission of a beacon signal across time.

FIG. 7 shows an exemplary transmission 700 for sending a signaling message (e.g., a reduce interference request) with a beacon signal in accordance with the second beacon design. In this example, the signaling message may be mapped to L=12 code symbols $c_0$ through $c_{11}$ in GF(T=8). The 12 code symbols may be partitioned into Q=3 symbol sets, with each symbol set including N=4 code symbols. The three sets of code symbols may be sent in three resource segments. Each resource segment may cover N=4 subcarriers in T=8 symbol periods. The four subcarriers may be assigned indices of 0 through 3, and the eight symbol periods in each resource segment may be assigned indices of 0 through 7.

The first symbol set may include the first four code symbols $c_0$ through $c_3$, which may be sent on subcarriers 0 through 3, respectively, in resource segment 1. The second symbol set may include the next four code symbols $c_4$ through $c_7$, which may be sent on subcarriers 0 through 3, respectively, in resource segment 2. The third symbol set may include the last four code symbols $c_8$ to $c_{11}$, which may be sent on subcarriers 0 through 3, respectively, in resource segment 3. For the first symbol set, code symbol $c_0$ may be sent on subcarrier 0 in one of the eight symbol periods in resource segment 1, with the specific symbol period being determined by the value of code symbol $c_0$. The selected symbol period on a subcarrier may be referred to as a beacon resource element. Code symbol $c_1$ may be sent on subcarrier 1 in a symbol period determined by the value of this code symbol. Each remaining code symbol may be sent in a similar manner.

In the example shown in FIG. 7, the signaling message is mapped to a codeword comprising 12 code symbols $c_0$ through $c_{11}$ having values of 0, 2, 7, 6, 2, 0, 3, 5, 4, 4, 6 and 1. The first set of four code symbols {0, 2, 7, 6} is sent in resource segment 1, with code symbol $c_0$=0 being sent on subcarrier 0 in symbol period 0, code symbol $c_1$=2 being sent on subcarrier 1 in symbol period 2, code symbol $c_2$=7 being sent on subcarrier 2 in symbol period 7, and code symbol $c_3$=6 being sent on subcarrier 3 in symbol period 6. The remaining code symbols may be sent as shown in FIG. 7. The resource element used for each code symbol is labeled with "×" in FIG. 7.

In general, a signaling message may be mapped to L code symbols in GF(T). The L codewords may be partitioned into Q symbol sets, with each symbol set including N code symbols. Each set of N code symbols may be sent in a resource segment covering N subcarriers in T symbol periods. For example, the first N code symbols $c_0$ to $c_{N-1}$ may be sent on subcarriers 0 to N−1, respectively, in resource segment 1, the next N code symbols $c_N$ to $c_{2N-1}$ may be sent on subcarriers 0 to N−1, respectively, in resource segment 2, etc. In one design, code symbol $c_l$ may be sent on subcarrier n in symbol period t of resource segment q, which may be determined as follows:

$$n = l \bmod N, \quad \text{Eq (4a)}$$

$$t = c_l, \text{ and} \quad \text{Eq (4b)}$$

$$q = \lfloor l/N \rfloor, \quad \text{Eq (4c)}$$

where "mod" denotes a modulo operation.

The N code symbols in each set may thus be sent in one resource segment. The resource segment may include N beacon resource elements for the N code symbols, and the beacon resource elements may be dispersed throughout the resource segment. The beacon signal for the signaling message may be sent in Q resource segments. L, N, T and Q may have any suitable values.

In one design, the Q resource segments used to send the beacon signal may start at any symbol period. This design may be used for both synchronous and asynchronous networks. In another design, specific resource segments may be reserved for sending signaling messages. This design may be more applicable for a synchronous network. The resource segments may also be defined in other manners.

A receiver station may detect for beacon signals sent by transmitter stations. The receiver station may search for beacon signals in Q' resource segments, where 1≤Q'≤Q. The receiver station may start the search in one particular symbol period. The receiver station may examine Q'+1 contiguous resource segments and may combine beacon subcarriers in sets of two contiguous resource segments to obtain Q' resource segments. The receiver station may then perform a search and find all candidate codewords in the Q' resource segments. The receiver station may identify and remove spurious codewords. The receiver station may check if matching condition is satisfied with the detected beacon subcarriers to remove spurious codewords. The receiver station may repeat the search after a certain number of symbol periods. For example if Q'=Q, then the process may be repeated every T symbol periods in order to detect all transmitted signaling messages. If Q'=1, then the process may be repeated every Q·T symbol periods. In general, the process may be repeated every (Q−Q'+1)·T symbol periods.

To enable detection by the receiver station, the codebook may be defined such that (i) cyclic shifts of codewords by N is also a codeword and (ii) linear shift of codeword is also a codeword. Reed-Solomon codes may be generated to meet both of these constraints for certain values of N, T and Q.

In an asynchronous network, the receiver station may not know the symbol timing of a transmitter station. The receiver station may thus be unable to differentiate between codewords that are linear shifts of one another and certain cyclic shifts of codewords by N. For example, the receiver station may be unable to differentiate between a codeword with a value of x sent in symbol period t and a codeword with a value of x+1 sent on the same subcarrier one symbol period later. All codewords that the receiver station cannot differentiate (e.g., codewords with different linear shifts and indistinguishable cyclic shifts) may be mapped to the same signaling message. In one design, to ensure that all linear shifts of a codeword map to the same signaling message, only codewords that start with $c_0$=0 may be selected for use, and codewords that have other values of $c_0$ may be discarded. The number of valid codewords may then be reduced from $T^S$ to $T^{S-1}$. However, this design may avoid ambiguity due to linear shifts with unknown symbol timing. A similar constraint may be applied for codewords of indistinguishable cyclic shifts to ensure that these codewords map to the same signaling message. In one design, T=257, S=3, and 10 information bits may be sent in a signaling message. More information bits may be sent with a larger GF size and/or more information symbols.

The receiver station may have timing misalignment at symbol level with respect to each transmitter station. The receiver station may make use of this to remove spurious codewords/beacon signals.

Figure 8:
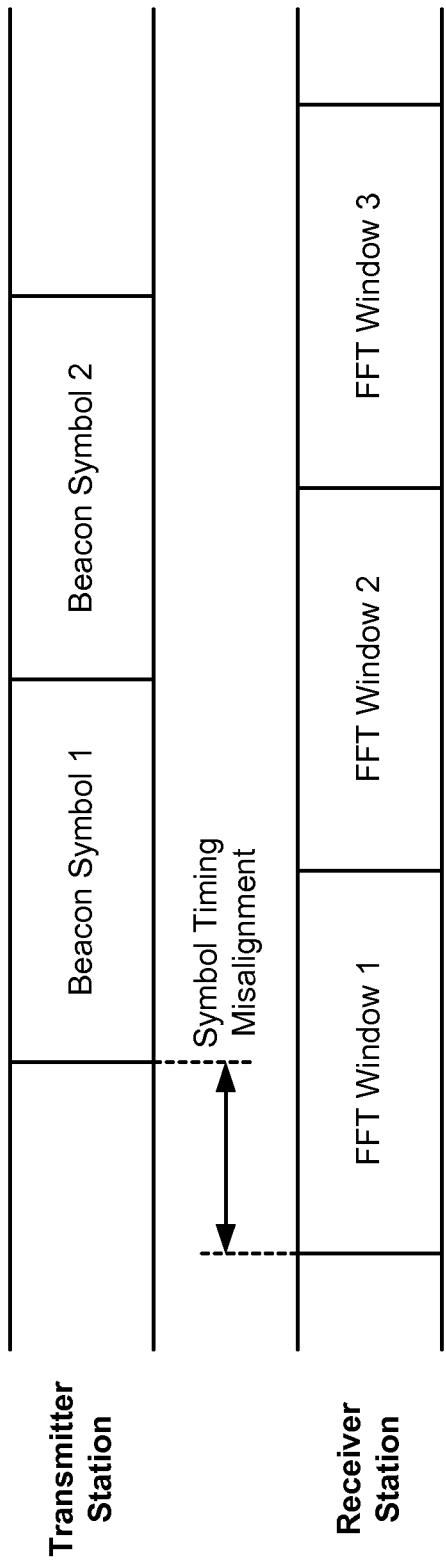
FIG. 8 shows symbol timing misalignment with asynchronous operation.

FIG. 8 shows an example of symbol timing misalignment with asynchronous operation. A transmitter station may transmit beacon symbols based on its symbol timing. A receiver station may not know the symbol timing of the transmitter station and may place its fast Fourier transform (FFT) window based on its symbol timing. The symbol timing of the receiver station may be offset by as much as one half symbol period from the symbol timing of the transmitter station. The first part of beacon symbol 1 may be captured by FFT window 1, and the remaining part of beacon symbol 1 may be captured by FFT window 2 due to symbol timing misalignment. Inter-symbol interference (ISI) and inter-carrier interference (ICI) may then occur. With symbol timing misalignment, the received power P of beacon subcarrier n in beacon symbol $t_{rx}$ may be (i) spread across two FFT windows $t_{rx}$ and $t_{rx}+1$ due to ISI and (ii) spread to adjacent subcarriers n−1 and n+1 due to ICI. Table 2 gives the amount of received power on subcarriers n, n−1 and n+1 in FFT windows $t_{rx}$ and $t_{rx}+1$ due to a worst case (50%) misalignment of the symbol timing of the receiver station.

TABLE 2

|  | Subcarrier n − 1 | Beacon Subcarrier n | Subcarrier n + 1 |
| --- | --- | --- | --- |
| FFT window $t_{rx}$ | P/10 | P/4 | P/10 |
| FFT window $t_{rx}$ + 1 | P/10 | P/4 | P/10 |

Figure 9:
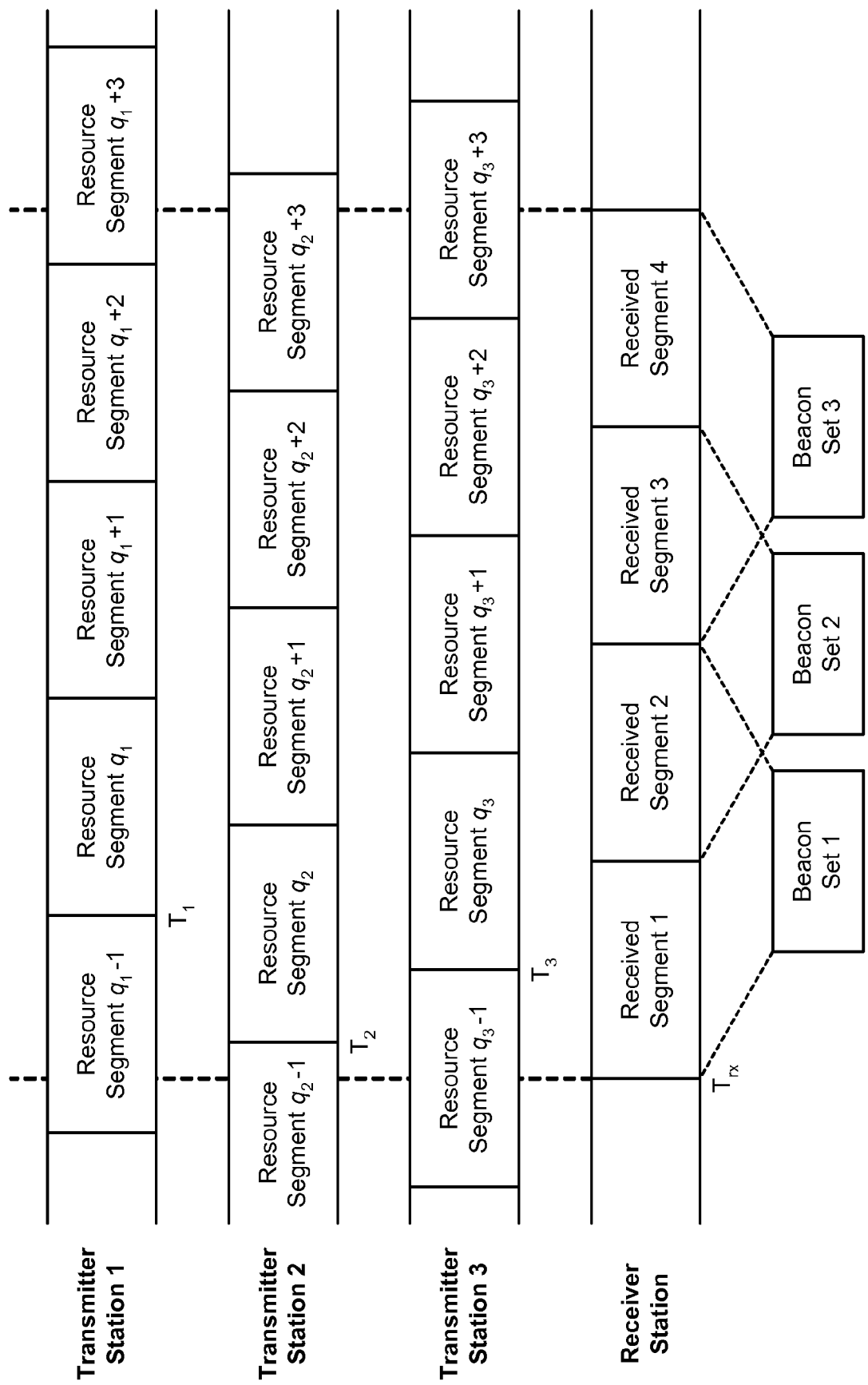
FIG. 9 shows a timing diagram for transmitter and receiver stations.

FIG. 9 shows an exemplary timing diagram for three transmitter stations and a receiver station. Transmitter station 1 may have resource segment $q_1$ starting at time $T_1$, transmitter station 2 may have resource segment $q_2$ starting at time $T_2$, transmitter station 3 may have resource segment $q_3$ starting at time $T_3$, and the receiver station may have resource segment 1 starting at time $T_{rx}$. The start times $T_1$, $T_2$, $T_3$ and $T_{rx}$ may not be aligned due to asynchronous operation, as shown in FIG. 9. For clarity, a resource segment used by a transmitter station is referred to as a transmit segment, and a resource segment at the receiver station is referred to as a received segment.

In the example shown in FIG. 9, a transmitter station may send a beacon signal for a signaling message in Q=3 consecutive resource segments. The receiver station may attempt to recover signaling messages sent by the transmitter stations as follows.

For each symbol period in each received segment, the received power of each subcarrier may be determined and compared against a power threshold. A beacon subcarrier may be declared for each subcarrier with received power exceeding the power threshold. The power threshold may be a static value or a dynamic value. A beacon set may be formed for each pair of received segments. Beacon set v may cover received segments v and v+1 and may include all detected beacon subcarriers in received segments v and v+1. This may ensure that all beacon subcarriers in one transmit segment can be collected in one beacon set regardless of the amount of symbol timing misalignment. This may also ensure that if the beacon subcarriers in transmit segment $q_n$ are completely in beacon set v, then the beacon subcarriers in transmit segment $q_n+i$ are completely in beacon set v+i, for i=1, 2, etc.

Beacon detection may then be performed on the beacon sets in a similar manner as beacon detection for the first beacon design described above for FIG. 6. In one design, all codewords with at least D out of L beacon subcarriers matching the detected beacon subcarriers may be identified as candidate codewords and may be stored in a candidate set. Spurious codewords in the candidate set may be identified (e.g., based on the similarity metric described above) and removed from the candidate set. Spurious codewords may also be detected due to beacon subcarriers in two resource segments being combined to find the codewords. After finding a codeword, the resource segment in which the beacon signal is sent is known, and a check may be made to determine whether the beacon signal is present in the correct resource segment in order to identify a spurious codeword. Candidate codewords with low power may also be removed from the candidate set. After removing spurious codewords and low-power codewords, all remaining candidate codewords may be declared as present.

As shown in Table 2, misalignment of the FFT windows may result in the received power of a beacon subcarrier being smeared across two FFT windows and across three subcarriers. In one design, the smearing of received power of a beacon subcarrier across frequency may be mitigated by reserving subsets of two subcarriers. For example, instead of using one set of four subcarriers as shown in FIG. 7, two subsets of two subcarriers may be used. The smearing of received power may then be limited to only one subcarrier, which may be either subcarrier n−1 or n+1. In another design, the smearing of received power of a beacon subcarrier across frequency may be mitigated by reserving subsets of one subcarrier. In general, fewer subcarriers per subset may limit the amount of smearing across frequency but may result in more overhead due to use of one or more guard subcarriers to protect each subset of subcarriers, as shown in FIGS. 4A and 4B.

Figure 10:
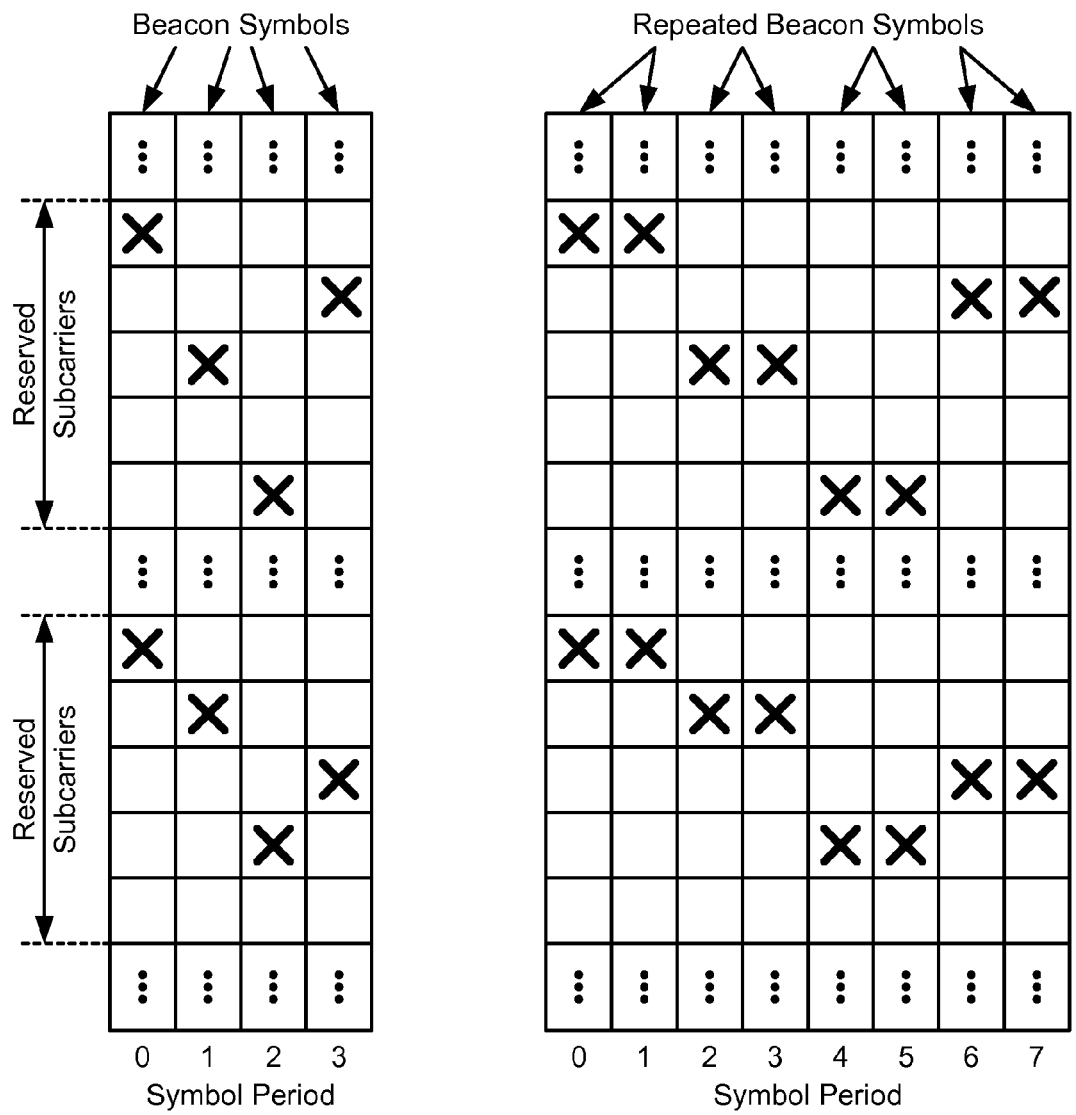
FIG. 10 shows symbol repetition to combat symbol timing misalignment.

FIG. 10 shows a design of mitigating both ISI and ICI due to symbol timing misalignment in an asynchronous network. This design may be used with the first beacon design when synchronization within the cyclic prefix duration is not achieved, i.e., the difference in the reception times of an OFDM symbol via significant signal paths from different base stations (or UEs) of interest is not within the cyclic prefix. In this design, each beacon symbol may be repeated and sent in two consecutive symbol periods. A phase-continuous signal may be sent on each beacon subcarrier in two consecutive symbol periods.

Figure 11:
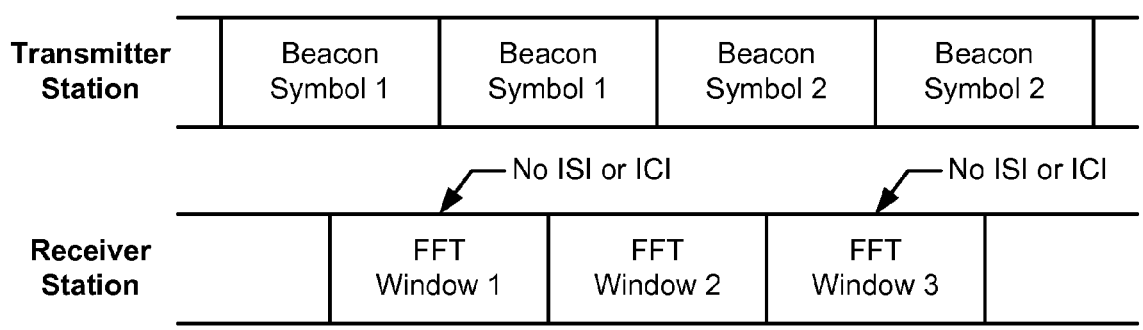
FIG. 11 shows a timing diagram with beacon symbol repetition.

FIG. 11 shows FFT windows at a receiver station with misaligned symbol timing. By transmitting each beacon symbol in two consecutive symbol periods, e.g., as shown in FIG. 10, one FFT window (e.g., FFT window 1 in FIG. 11) at the receiver station will be located within the two beacon symbols and can thus capture the beacon subcarrier with minimal ISI and ICI. The next FFT window (e.g., FFT window 2 in FIG. 11) will span two different beacon symbols and may observe ISI and ICI. The receiver station may use the set of alternate FFT windows without ISI and ICI for decoding and may discard the other set of alternate FFT windows with ISI and ICI.

As shown in FIGS. 5 and 7, the first beacon design may transmit each code symbol across frequency whereas the second beacon design may transmit each code symbol across time. Sending each code symbol across frequency may reduce the amount of time to send a signaling message. Sending each code symbol across time may reduce the amount of frequency resources to reserve for sending signaling messages. For the first beacon design, the number of reserved subcarriers may be dependent on the GF size, which may be relatively large for an efficient block code. For the second beacon design, the number of reserved subcarriers may be flexibly selected based on a tradeoff between the resource overhead and the amount of time for sending signaling messages.

In another aspect, power control of an interfering station may be achieved via a reduce interference request. In one design of power control of an interfering UE, a serving base station may send a reduce interference request at a transmit power level of $P_{TX\_msg}$, which may the determined as follows:

$$P_{TX\_msg} = \frac{P_C^2}{I_{target}}, \quad \text{Eq (5)}$$

where $P_C$ is a reference value that is described below, and $I_{target}$ is a target interference level for the serving base station.

The interfering UE may receive the reduce interference request at a received power level of $P_{RX\_msg}$, which may be expressed as:

$$P_{RX\_msg} = \frac{h^2 \cdot P_C^2}{I_{target}}, \quad \text{Eq (6)}$$

where h is a channel gain from the serving base station to the interfering UE.

The interfering UE may honor the reduce interference request and may determine its transmit power $P_d$, as follows:

$$P_d = \frac{P_C^2}{P_{RX\_msg}} = \frac{I_{target}}{h^2}. \quad \text{Eq (7)}$$

The interfering UE may use transmit power of $P_d$ or lower for data transmission. The data transmission from the UE would then cause interference of $I_{target}$ or lower at the serving base station, assuming only one interfering UE and symmetric downlink and uplink channels.

Power control of an interfering base station may be performed in a similar manner. A UE may send a reduce interference request at a transmit power level of $P_{TX\_msg}$. The interfering base station may receive the reduce interference request at a received power level of $P_{RX\_msg}$. The interfering base station may honor the request and may reduce its transmit power to $P_d$ or lower. Data transmission from the interfering base station may then cause interference of $I_{target}$ or lower at the UE, assuming one interfering base station and symmetric downlink and uplink channels.

For power control, the transmit power of a reduce interference request may be set to achieve a target interference level at the sender of the request. The target interference level may be selected based on the desired data performance and may also be set to account for errors in the number of interfering stations, fade imbalance between the downlink and uplink, calibration errors between transmit and receive chains at different stations, etc.

In one design, all base stations may use the same $P_C$ value. In another design, base station of different power classes may use different $P_C$ values. For example, high-power macro base stations may use a first $P_C$ value, and low-power pico and femto base stations may use a second $P_C$ value, which may be lower than the first $P_C$ value. In one design, all UEs may use the same $P_C$ value, which may or may not match the $P_C$ value(s) used by the base stations. In one design, multiple sets of subcarriers may be reserved for sending reduce interference requests, and different $P_C$ values may be used for different reserved subcarrier sets. A UE may select one of the reserved subcarrier sets for sending a reduce interference request based on the distance from the UE to an interfering base station. The power used to transmit the reduce interference request may depend on the value of $P_C$, with a larger $P_C$ corresponding to more transmit power. To conserve power, the UE may use smaller $P_C$ values for base stations that are near and larger $P_C$ values for base stations that are far away.

Figures 12, 13:
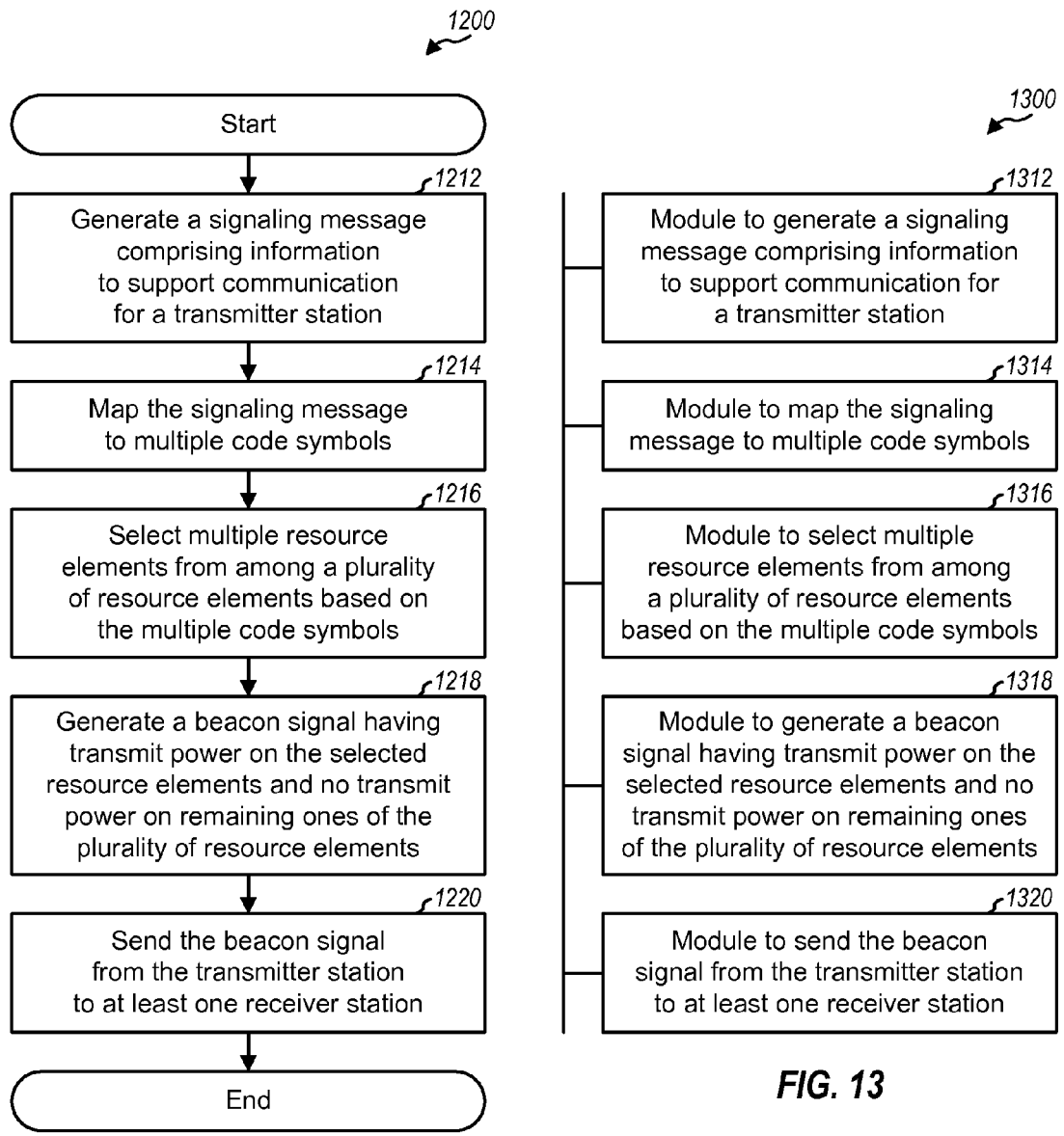
FIG. 12 shows a process for sending signaling in a wireless network.
FIG. 13 shows an apparatus for sending signaling in a wireless network.

FIG. 12 shows a design of a process 1200 for sending signaling in a wireless network. Process 1200 may be performed by a transmitter station, which may be a base station, a UE, or some other entity. The transmitter station may generate a signaling message comprising information to support communication for itself (block 1212). In one design, the signaling message may comprise a reduce interference request asking at least one interfering station to reduce interference to the transmitter station. The transmitter station may be a base station, and each interfering station may an interfering UE. Alternatively, the transmitter station may be a UE, and each interfering station may be an interfering base station. The signaling message may also comprise some other type of message.

The transmitter station may map the signaling message to multiple code symbols (block 1214). In one design, the transmitter station may map the signaling message to at least one information symbol and may then encode the at least one information symbol in accordance with a block code to obtain the multiple code symbols. The transmitter station may also map the signaling message to the multiple code symbols in other manners.

The transmitter station may select multiple resource elements from among a plurality of resource elements based on the multiple code symbols (block 1216). The transmitter station may generate a beacon signal having transmit power on the selected resource elements and no transmit power on remaining ones of the plurality of resource elements (block 1218). The transmitter station may send the beacon signal to at least one receiver station, which may operate synchronously or asynchronously with the transmitter station (block 1220).

In one design of block 1216, the transmitter station may determine multiple sets of resource elements formed with the plurality of resource elements, one set of resource elements for each code symbol. The transmitter station may select one resource element in each set of resource elements based on a corresponding code symbol. Each code symbol may have a value within a range of 0 to N−1, where N may be greater than one. The resource elements in each set may be assigned indices 0 to N−1. The transmitter station may select a resource element with an index of X for a code symbol with a value of X, where X is within a range of 0 to N−1.

In one design, each code symbol may be sent across frequency, e.g., as shown in FIG. 5. In this design, each set of resource elements may cover multiple subcarriers in one symbol period. One of the multiple subcarriers may be selected in each symbol period based on a code symbol to send in that symbol period. In another design, each code symbol may be sent across time, e.g., as shown in FIG. 7. In this design, each set of resource elements may cover resource elements on one subcarrier in multiple symbol periods. One of the multiple symbol periods on a subcarrier may be selected based on a code symbol to send on the subcarrier. In one design, the plurality of resource elements may be partitioned into multiple resource segments. Each resource segment may include at least one set of resource elements on at least one subcarrier reserved for sending the signaling message.

In one design, the plurality of resource elements may belong in a resource segment that may be reserved for sending the signaling message and located at a known time and frequency location. This design may be applicable for a synchronous network. In another design, the plurality of resource elements may be formed with multiple subcarriers reserved for sending the signaling message and may start in any symbol period. This design may be applicable for an asynchronous network.

In one design, a single set of subcarriers may be reserved for sending the signaling message, e.g., as shown in FIG. 4A. In another design, at least two non-contiguous subsets of subcarriers may be reserved for sending the signaling message, with each subset including at least one subcarrier. In one design, each set or subset of subcarriers may be isolated by at least one guard subcarrier from other subcarriers usable for transmission. This design may be especially suitable for asynchronous operation.

In one design, the plurality of resource elements may be usable for sending signaling messages in one cell in the wireless network. Different pluralities of resource elements may be usable for sending signaling messages in different cells. In another design, the plurality of resource elements may be usable for sending signaling messages in all cells in the wireless network. The resource elements usable for sending signaling messages may be cleared of interference from other transmissions.

In one design of block 1218, the transmitter station may generate an OFDM symbol or an SC-FDM symbol having transmit power on each selected resource element, if any, in each symbol period in which the beacon signal is sent. The transmitter station may send the OFDM or SC-FDM symbol generated for each symbol period. In another design, the transmitter station may repeat each selected resource element across two consecutive symbol periods (e.g., as shown in FIG. 10) to allow a receiver station to receive the signaling message with less ISI and less ICI due to misaligned symbol timing at the receiver station. The remaining resource elements may have no or low power, e.g., as shown in FIG. 10.

FIG. 13 shows a design of an apparatus 1300 for sending signaling in a wireless network. Apparatus 1300 includes a module 1312 to generate a signaling message comprising information to support communication for a transmitter station, a module 1314 to map the signaling message to multiple code symbols, a module 1316 to select multiple resource elements from among a plurality of resource elements based on the multiple code symbols, a module 1318 to generate a beacon signal having transmit power on the selected resource elements and no transmit power on remaining ones of the plurality of resource elements, and a module 1320 to send the beacon signal from the transmitter station to at least one receiver station.

Figures 14, 15:
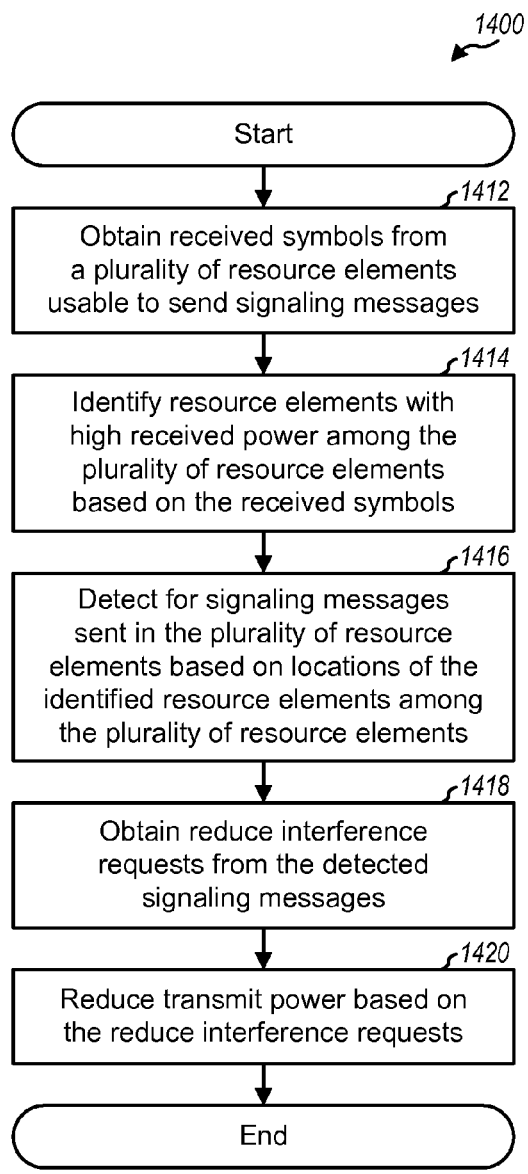
FIG. 14 shows a process for receiving signaling in a wireless network.
FIG. 15 shows an apparatus for receiving signaling in a wireless network.

FIG. 14 shows a design of a process 1400 for receiving signaling in a wireless network. Process 1400 may be performed by a receiver station, which may be a base station, a UE, or some other entity. The receiver station may obtain received symbols from a plurality of resource elements usable to send signaling messages (block 1412). The receiver station may identify resource elements with high received power among the plurality of resource elements based on the received symbols (block 1414). The receiver station may then detect for signaling messages sent in the plurality of resource elements based on the locations of the identified resource elements among the plurality of resource elements (block 1416). Each signaling message may be sent on multiple resource elements selected from among the plurality of resource elements based on the signaling message.

In one design, each signaling message may be mapped to one of a plurality of codewords. Each codeword may be mapped to L resource elements in L sets of resource elements formed by the plurality of resource elements, one mapped resource element in each set. In one design, each set of resource elements may cover multiple subcarriers in one symbol period, e.g., as shown in FIG. 5. In another design, each set of resource elements may cover one subcarrier in multiple symbol periods, e.g., as shown in FIG. 7. For both designs, the receiver station may identify resource elements with high received power in each set of resource elements. The receiver station may then detect for signaling messages based on the locations of the identified resource elements in each set of resource elements.

In one design of block 1416, the receiver station may identify candidate codewords each having at least D out of L resource elements matching the identified resource elements, where D is less than L. The receiver station may identify candidate codewords to remove based on the number of matched resource elements and the number of similar resource elements for each candidate codeword. The receiver station may then remove each candidate codeword identified for removal. The receiver station may also remove each candidate codeword with low received power. The receiver station may then detect for signaling messages sent in the plurality of resource elements based on the candidate codewords not removed. For example, a signaling message may be declared for each candidate codeword not removed.

In one design, the receiver station may obtain reduce interference requests from the detected signaling messages (block 1418). The receiver station may reduce its transmit power based on the reduce interference requests (block 1420). The detected signaling messages may also be other types of messages, and the receiver station may take appropriate actions in response to the detected signaling messages.

FIG. 15 shows a design of an apparatus 1500 for receiving signaling in a wireless network. Apparatus 1500 includes a module 1112 to obtain received symbols from a plurality of resource elements usable to send signaling messages, a module 1114 to identify resource elements with high received power among the plurality of resource elements based on the received symbols, a module 1116 to detect for signaling messages sent in the plurality of resource elements based on the locations of the identified resource elements among the plurality of resource elements, with each signaling message being sent on multiple resource elements selected from among the plurality of resource elements based on the signaling message, a module 1118 to obtain reduce interference requests from the detected signaling messages, and a module 1120 to reduce transmit power based on the reduce interference requests.

The modules in FIGS. 13 and 15 may comprise processors, electronics devices, hardware devices, electronics components, logical circuits, memories, software codes, firmware codes, etc., or any combination thereof.

Figure 16:
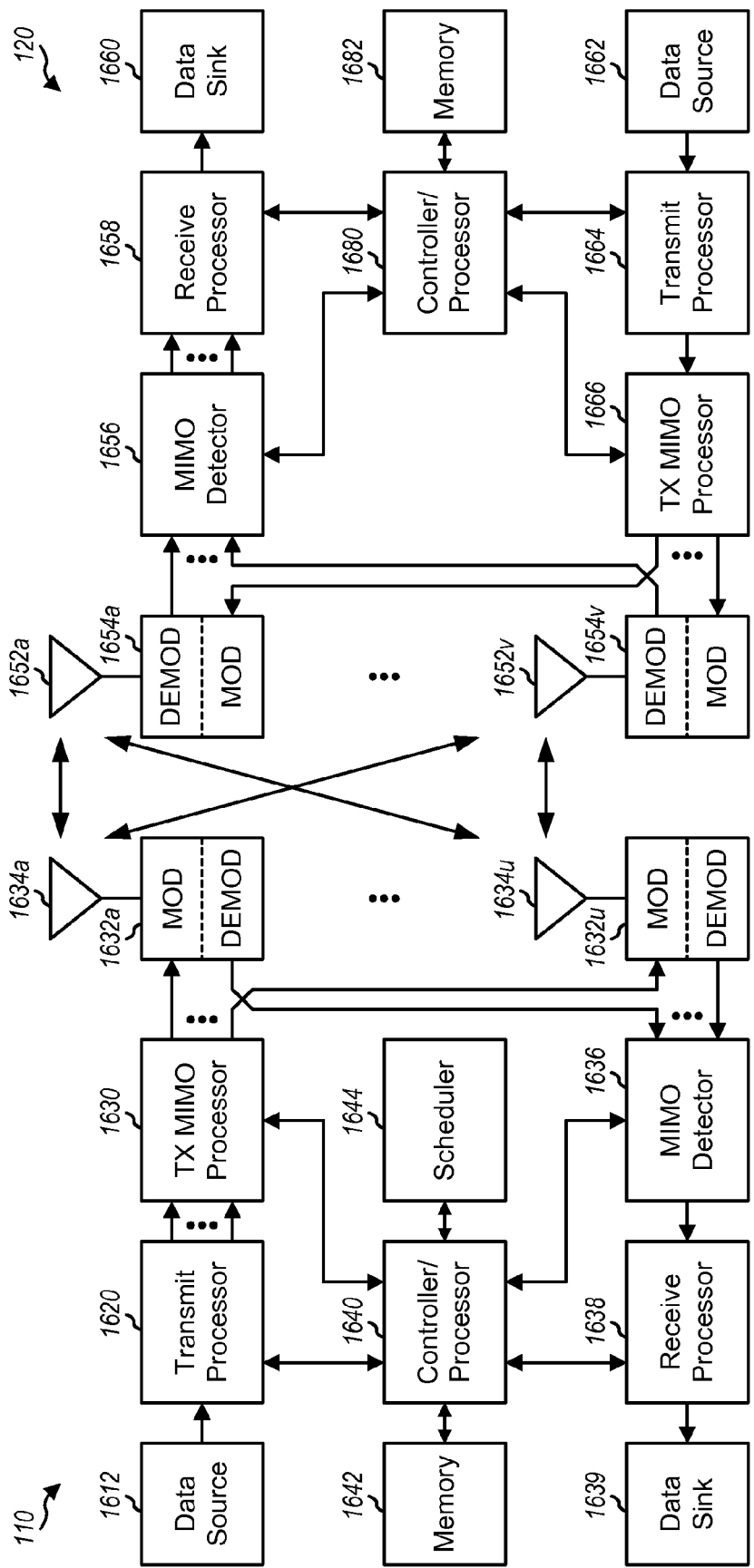
FIG. 16 shows a block diagram of a base station and a UE.

FIG. 16 shows a block diagram of a design of a base station 110 and a UE 120, which may be one of the base stations and one of the UEs in FIG. 1. Base station 110 may be equipped with U antennas 1634a through 1634u, and UE 120 may be equipped with V antennas 1652a through 1652v, where in general U≥1 and V≥1.

At base station 110, a transmit processor 1620 may receive data for one or more UEs from a data source 1612, process (e.g., encode, interleave, and modulate) the data, and provide data symbols. Transmit processor 1620 may also receive control information (e.g., for the messages shown in FIGS. 2 and 3) from a controller/processor 1640, process the control information, and provide control symbols. Transmit processor 1620 may also generate reference signal symbols for one or more reference signals or pilots. A transmit (TX) multiple-input multiple-output (MIMO) processor 1630 may perform spatial processing (e.g., preceding) on the data symbols, the control symbols, and/or the reference signal symbols, if applicable, and may provide U output symbol streams to U modulators (MODs) 1632a through 1632u. Each modulator 1632 may process a respective output symbol stream (e.g., for OFDM, etc.) to obtain an output sample stream. Each modulator 1632 may further process (e.g., convert to analog, amplify, filter, and upconvert) the output sample stream to obtain a downlink signal. U downlink signals from modulators 1632a through 1632t may be transmitted via U antennas 1634a through 1634u, respectively.

At UE 120, antennas 1652a through 1652v may receive the downlink signals from base station 110 and may provide received signals to demodulators (DEMODs) 1654a through 1654v, respectively. Each demodulator 1654 may condition (e.g., filter, amplify, downconvert, and digitize) a respective received signal to obtain input samples. Each demodulator 1654 may further process the input samples (e.g., for OFDM, etc.) to obtain received symbols. A MIMO detector 1656 may obtain received symbols from all V demodulators 1654a through 1654v, perform MIMO detection on the received symbols if applicable, and provide detected symbols. A receive processor 1658 may process (e.g., demodulate, deinterleave, and decode) the detected symbols, provide decoded data for UE 120 to a data sink 1660, and provide decoded information to a controller/processor 1680.

On the uplink, at UE 120, a transmit processor 1664 may receive and process data from a data source 1662 and control information from controller/processor 1680. Transmit processor 1664 may also generate reference signal symbols for one or more reference signals. The symbols from transmit processor 1664 may be precoded by a TX MIMO processor 1666 if applicable, further processed by modulators 1654a through 1654v, and transmitted to base station 110. At base station 110, the uplink signals from UE 120 may be received by antennas 1634, processed by demodulators 1632, detected by a MIMO detector 1636 if applicable, and further processed by a receive processor 1638 to obtain the data and control information sent by UE 120.

Controllers/processors 1640 and 1680 may direct the operation at base station 110 and UE 120, respectively. Processor 1640 and/or other processors and modules at base station 110 may perform or direct process 600 in FIG. 6, process 1200 in FIG. 12, process 1400 in FIG. 14, and/or other processes for the techniques described herein. Processor 1680 and/or other processors and modules at UE 120 may also perform or direct process 600, process 1200, process 1400, and/or other processes for the techniques described herein. Memories 1642 and 1682 may store data and program codes for base station 110 and UE 120, respectively. A scheduler 1644 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending signaling in a wireless communication network, comprising:
   mapping a signaling message to multiple code symbols;
   selecting multiple resource elements from among a plurality of resource elements based on the multiple code symbols; and
   generating a beacon signal having transmit power on the selected resource elements and no transmit power on remaining ones of the plurality of resource elements;
   wherein selecting multiple resource elements comprises determining multiple sets of resource elements formed with the plurality of resource elements, one set of resource elements for each code symbol, and selecting one resource element in each set of resource elements based on a corresponding code symbol; and
   wherein each set of resource elements covers one subcarrier in multiple symbol periods, and wherein selecting one resource element in each set of resource elements comprises selecting one of the multiple symbol periods on each subcarrier based on a code symbol to send on the subcarrier.

2. The method of claim 1, further comprising:
   sending the beacon signal from a transmitter station to at least one receiver station operating asynchronously with the transmitter station.

3. The method of claim 1, further comprising:
   generating the signaling message comprising a reduce interference request asking at least one interfering station to reduce interference to a transmitter station.

4. The method of claim 3, wherein the transmitter station is a base station and the at least one interfering station is at least one interfering user equipment (UE).

5. The method of claim 3, wherein the transmitter station is a user equipment (UE) and the at least one interfering station is at least one interfering base station.

6. The method of claim 1, wherein the mapping the signaling message comprises
   mapping the signaling message to at least one information symbol, and
   encoding the at least one information symbol in accordance with a block code to obtain the multiple code symbols.

7. The method of claim 1, wherein each code symbol has a value within a range of 0 to N−1, where N is greater than one, wherein the resource elements in each set are assigned indices 0 to N−1, and wherein a resource element with an index of X is selected for a code symbol with a value of X, where X is within a range of 0 to N−1.

8. The method of claim 1, wherein each set of resource elements covers multiple subcarriers in one symbol period, and wherein the selecting one resource element in each set of resource elements comprises selecting one of the multiple subcarriers in each symbol period based on a code symbol to send in the symbol period.

9. The method of claim 1, wherein the plurality of resource elements are partitioned into multiple resource segments, each resource segment comprising at least one set of resource elements on at least one subcarrier reserved for sending the signaling message.

10. The method of claim 1, wherein the plurality of resource elements belong in a resource segment reserved for sending the signaling message and located at a predetermined time and frequency location.

11. The method of claim 1, wherein the plurality of resource elements are formed with multiple subcarriers, reserved for sending the signaling message, starting in any symbol period.

12. The method of claim 1, wherein the generating the beacon signal comprises
   generating an orthogonal frequency division multiplexing (OFDM) symbol or a single-carrier frequency division multiplexing (SC-FDM) symbol having transmit power on each selected resource element, if any, for each symbol period in which the beacon signal is sent, and
   repeating each selected resource element across two consecutive symbol periods to allow a receiver station to receive the signaling message with less inter-symbol interference (ISI) and less inter-carrier interference (ICI) due to misaligned symbol timing at the receiver station.

13. The method of claim 1, further comprising:
   determining at least two non-contiguous subsets of subcarriers reserved for sending the signaling message, each subset including at least one subcarrier; and
   determining the plurality of resource elements formed by the at least two non-contiguous subsets of subcarriers in multiple symbol periods.

14. The method of claim 13, wherein each subset of subcarriers is isolated by at least one guard subcarrier from other subcarriers usable for transmission.

15. The method of claim 1, wherein the plurality of resource elements are usable for sending signaling messages in one cell in the wireless communication network, and wherein different pluralities of resource elements are usable for sending signaling messages in different cells in the wireless communication network.

16. The method of claim 1, wherein the plurality of resource elements are usable for sending signaling messages in all cells in the wireless communication network.

17. An apparatus for wireless communication, comprising:
   means for mapping a signaling message to multiple code symbols;

means for selecting multiple resource elements from among a plurality of resource elements based on the multiple code symbols; and means for generating a beacon signal having transmit power on the selected resource elements and no transmit power on remaining ones of the plurality of resource elements;

wherein the means for selecting multiple resource elements comprises: means for determining multiple sets of resource elements formed with the plurality of resource elements, one set of resource elements for each code symbol, and means for selecting one resource element in each set of resource elements based on a corresponding code symbol; and wherein each set of resource elements covers one subcarrier in multiple symbol periods, and wherein the means for selecting one resource element in each set of resource elements comprises means for selecting one of the multiple symbol periods on each subcarrier based on a code symbol to send on the subcarrier.

18. The apparatus of claim 17, further comprising:
means for sending the beacon signal from a transmitter station to at least one receiver station operating asynchronously with the transmitter station.

19. The apparatus of claim 17, further comprising:
means for generating the signaling message comprising a reduce interference request asking at least one interfering station to reduce interference to a transmitter station.

20. The apparatus of claim 17, wherein each set of resource elements covers multiple subcarriers in one symbol period, and wherein the means for selecting one resource element in each set of resource elements comprises means for selecting one of the multiple subcarriers in each symbol period based on a code symbol to send in the symbol period.

21. An apparatus for wireless communication, comprising:
a processor;
memory coupled to the processor; and
instructions stored in the memory, wherein the instructions are executable by the processor to:
map a signaling message to multiple code symbols;
select multiple resource elements from among a plurality of resource elements based on the multiple code symbols; and
generate a beacon signal having transmit power on the selected resource elements and no transmit power on remaining ones of the plurality of resource elements;
wherein selecting multiple resource elements comprises determining multiple sets of resource elements formed with the plurality of resource elements, one set of resource elements for each code symbol, and selecting one resource element in each of resource elements based on a corresponding code symbol; and
wherein each set of resource elements covers one subcarrier in multiple symbol periods, and wherein selecting one resource element in each set of resource elements comprises selecting one of the multiple symbol periods on each subcarrier based on a code symbol to send on the subcarrier.

22. The apparatus of claim 21, wherein the at least one processor is configured to send the beacon signal from a transmitter station to at least one receiver station operating asynchronously with the transmitter station.

23. The apparatus of claim 21, wherein the at least one processor is configured to generate the signaling message comprising a reduce interference request asking at least one interfering station to reduce interference to a transmitter station.

24. The apparatus of claim 21, wherein each set of resource elements covers multiple subcarriers in one symbol period, and wherein the at least one processor is configured to select one of the multiple subcarriers in each symbol period based on a code symbol to send in the symbol period.

25. A non-transitory computer-readable medium storing computer-executable code for wireless communication, the code executable by a processor to cause a device to:
map a signaling message to multiple code symbols;
select multiple resource elements from among a plurality of resource elements based on the multiple code symbols; and
generate a beacon signal having transmit power on the selected resource elements and no transmit power on remaining ones of the plurality of resource elements;
wherein selecting multiple resource elements comprises determining multiple sets of resource elements formed with the plurality of resource elements, one set of resource elements for each code symbol, and selecting one resource element in each set of resource elements based on a corresponding code symbol; and
wherein each set of resource elements covers one subcarrier in multiple symbol periods, and wherein selecting one resource element in each set of resource elements comprises selecting one of the multiple symbol periods on each subcarrier based on a code symbol to send on the subcarrier.

* * * * *